United States Patent
Okuoka

(10) Patent No.: US 10,585,268 B2
(45) Date of Patent: Mar. 10, 2020

(54) ZOOM LENS AND IMAGE PICKUP APPARATUS

(71) Applicant: CANON KABUSHIKI KAISHA, Tokyo (JP)

(72) Inventor: Shinya Okuoka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 16/033,322

(22) Filed: Jul. 12, 2018

(65) Prior Publication Data

US 2019/0025560 A1 Jan. 24, 2019

(30) Foreign Application Priority Data

Jul. 21, 2017 (JP) .................. 2017-141664

(51) Int. Cl.
G02B 15/14 (2006.01)
G02B 15/20 (2006.01)
G02B 13/02 (2006.01)

(52) U.S. Cl.
CPC ............. *G02B 15/20* (2013.01); *G02B 13/02* (2013.01)

(58) Field of Classification Search
USPC ....................................................... 359/684
See application file for complete search history.

(56) References Cited

U.S. PATENT DOCUMENTS

2010/0085647 A1* 4/2010 Nurishi ................ G02B 15/173
359/687

FOREIGN PATENT DOCUMENTS

JP H11202202 A 7/1999
JP 2014041223 A 3/2014

* cited by examiner

*Primary Examiner* — James C. Jones
(74) *Attorney, Agent, or Firm* — Carter, DeLuca & Farrell LLP

(57) ABSTRACT

Provided is a zoom lens consisting of: a positive first lens unit; a negative second lens unit; a positive third lens unit; and a rear lens group including at least one lens unit, wherein an interval between each pair of adjacent lens units is changed during zooming. The rear lens group includes a negative lens unit LR including at least one positive lens and at least one negative lens. The at least one negative lens includes a negative lens made of a material having a largest Abbe number of the at least one negative lens. Each of an extraordinary partial dispersion ratio of the material, distances of a lens surface on an image side of the lens unit LR to an image plane at a telephoto end and at a wide angle end, and a focal length of the lens unit LR is appropriately set.

15 Claims, 13 Drawing Sheets

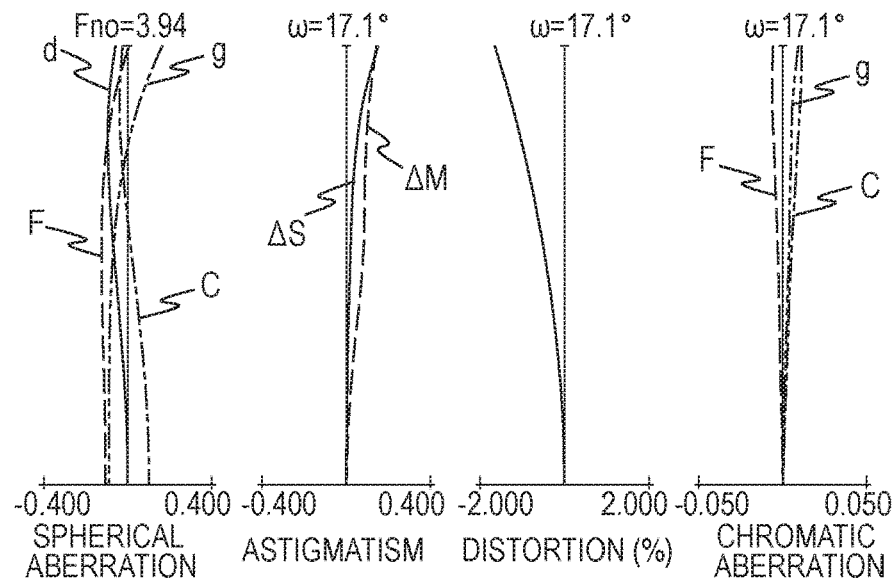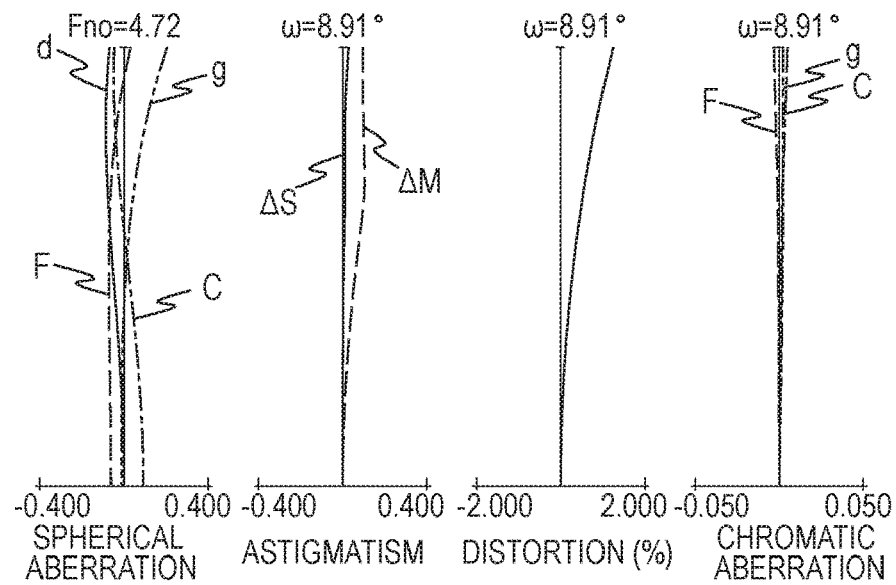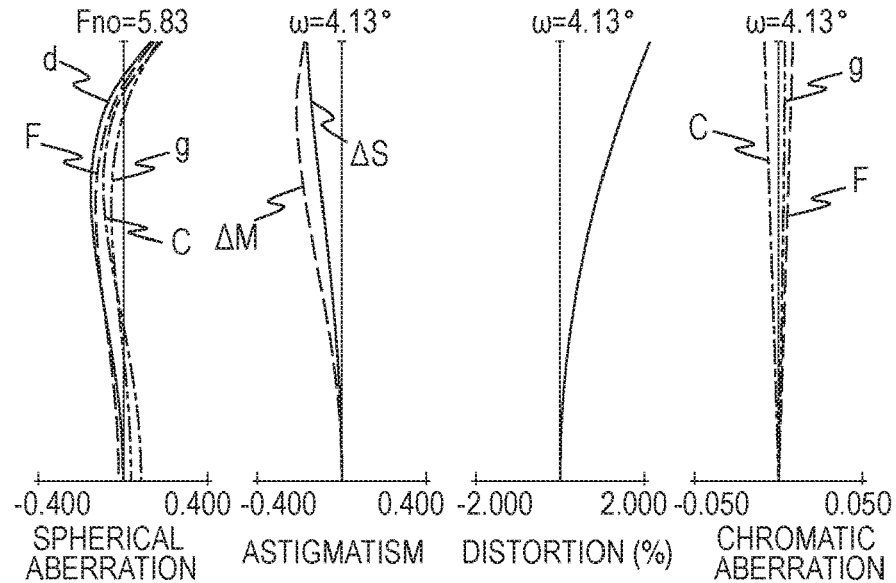

ZOOM LENS AND IMAGE PICKUP APPARATUS

BACKGROUND OF THE INVENTION

Field of the Invention

The present invention relates to a zoom lens and an image pickup apparatus, which are suitable for an image pickup apparatus using an image pickup element, for example, a video camera, an electronic still camera, a broadcasting camera, or a monitoring camera.

Description of the Related Art

In recent years, an image pickup apparatus using an image pickup element is downsized as an entire apparatus with the use of an electronic viewfinder. Further, it is required that an image pickup optical system for use with the image pickup apparatus be a zoom lens that is compact with a short back focus for reducing a total length of the zoom lens, and has high optical performance over the entire zoom range, for example. It is also required that the image pickup optical system be a zoom lens of a telephoto type including a long focal length, which facilitates taking an image of an object in the distance, for example. As a zoom lens that satisfies those requirements, there has been known a zoom lens of a telephoto type and a positive-lead type, in which a lens unit having a positive refractive power is arranged closest to an object side.

In general, in a zoom lens of a telephoto type, as the total length of the zoom lens becomes shorter, or as the focal length becomes longer, large chromatic aberration among various aberrations occurs. In the related art, there has been known a zoom lens of a telephoto type, in which chromatic aberration at that time is corrected with the use of a lens made of an extraordinary partial dispersion material (Japanese Patent Application Laid-Open Nos. H11-202202 and 2014-41223).

In each of Japanese Patent Application Laid-Open Nos. H11-202202 and 2014-41223, there has been disclosed a zoom lens consisting of, in order from an object side to an image side, a first lens unit having a positive refractive power, a second lens unit having a negative refractive power, a third lens unit having a positive refractive power, and a rear lens group, which follows the first lens unit, the second lens unit, and the third lens unit, and includes one or more lens units. Of the related art, in Japanese Patent Application Laid-Open No. H11-202202, the rear lens group consists of a fourth lens unit having a negative refractive power.

In Japanese Patent Application Laid-Open No. 2014-41223, the rear lens group consists of, in order from the object side to the image side, a fourth lens unit having a positive refractive power and a fifth lens unit having a negative refractive power. Alternatively, in Japanese Patent Application Laid-Open No. 2014-41223, the rear lens group consists of, in order from the object side to the image side, a fourth lens unit having a negative refractive power, a fifth lens unit having a positive refractive power, and a sixth lens unit having a negative refractive power.

Further, in each of Japanese Patent Application Laid-Open Nos. H11-202202 and 2014-41223, the lens made of the extraordinary partial dispersion material is used in the lens unit closest to the object side to correct chromatic aberration.

A zoom lens of a positive-lead type is relatively easy to achieve a high zoom ratio while downsizing the zoom lens. However, in the zoom lens of the positive-lead type, when a long focal length is to be achieved and the zoom lens is of the telephoto type while reducing the total length of the zoom lens, larger chromatic aberration and other various aberrations occur, and optical performance is significantly reduced.

In general, in a zoom lens of a telephoto type that achieves a long focal length, aberrations that occur in lens units on the front side are enlarged by lens units on the rear side. Therefore, in a zoom lens of a positive-lead type, in order to obtain high optical performance over the entire zoom range while reducing the total length of the zoom lens and downsizing the zoom lens, it is important to appropriately set a zoom type (the number of lens units and signs of refractive powers of the lens units). Further, it is important to appropriately set a lens structure of the lens units forming the zoom lens, for example.

SUMMARY OF THE INVENTION

According to one embodiment of the present invention, there is provided a zoom lens including, in order from an object side to an image side: a first lens unit having a positive refractive power; a second lens unit having a negative refractive power; a third lens unit having a positive refractive power; and a rear lens group including at least one lens unit, wherein an interval between each pair of adjacent lens units is changed during zooming, wherein the rear lens group includes a lens unit LR having a negative refractive power, wherein the lens unit LR includes at least one positive lens and at least one negative lens, wherein the at least one negative lens includes a negative lens LRN made of a material having a largest Abbe number of the at least one negative lens and satisfying the following conditional expression:

$$0.0 < \Delta\theta gF < 0.3,$$

where $\Delta\theta gF$ represents an extraordinary partial dispersion ratio of the material, and wherein the following conditional expressions are satisfied:

$$3.5 < bft/bfw < 50.0; \text{ and}$$

$$-100.0 < fr/bfw < -5.0,$$

where "bft" represents a distance from a lens surface on the image side of the lens unit LR to an image plane at a telephoto end, "bfw" represents a distance from the lens surface on the image side of the lens unit LR to the image plane at a wide angle end, and "fr" represents a focal length of the lens unit LR.

Further features of the present invention will become apparent from the following description of exemplary embodiments with reference to the attached drawings.

BRIEF DESCRIPTION OF THE DRAWINGS

FIG. 2A is an aberration diagram of the zoom lens according to Example 1 at the wide angle end.

FIG. 2B is an aberration diagram of the zoom lens according to Example 1 at the intermediate zoom position.

FIG. 2C is an aberration diagram of the zoom lens according to Example 1 at the telephoto end.

DESCRIPTION OF THE EMBODIMENTS

Now, exemplary embodiments of the present invention are described in detail with reference to the accompanying drawings.

In this specification, a "back focus" refers to a distance on an optical axis from the last lens surface to a paraxial image plane, which is expressed in an air-equivalent length. A "total length of a zoom lens" refers to a length obtained by adding the back focus to a distance on the optical axis from the frontmost surface (lens surface closest to an object side) to the last surface (lens surface closest to an image side) of the zoom lens. A "wide angle end" refers to a state in which a focal length of the zoom lens is shortest, and a "telephoto end" refers to a state in which the focal length of the zoom lens is longest.

A zoom lens according to each of Examples of the present invention includes, in order from an object side to an image side, a first lens unit L1 having a positive refractive power ((optical power)=(reciprocal of focal length)), a second lens unit L2 having a negative refractive power, a third lens unit L3 having a positive refractive power, and a rear lens group including one or more lens units. An interval between each pair of adjacent lens units is changed during zooming. The rear lens group includes a lens unit LR having a negative refractive power.

Figure 1A:
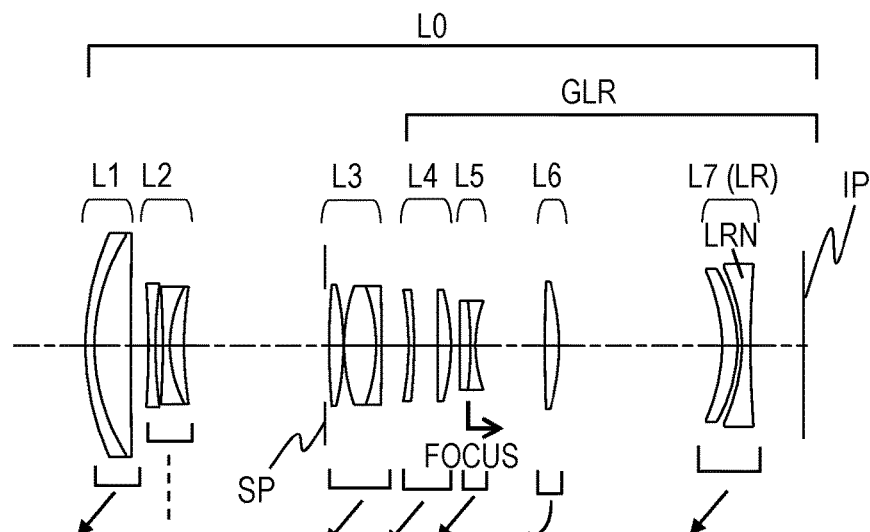
FIG. 1A is a lens cross-sectional view of a zoom lens according to Example 1 of the present invention at a wide angle end.
Figure 1B:
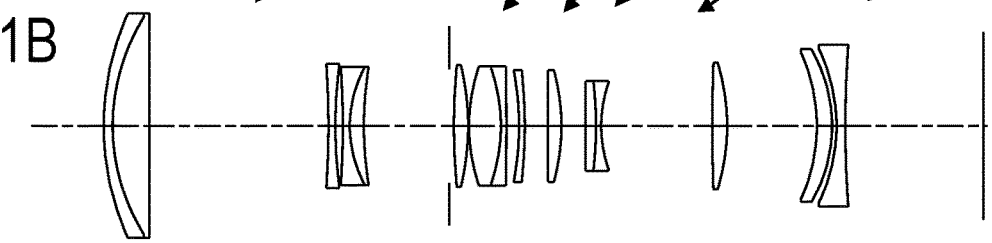
FIG. 1B is a lens cross-sectional view of the zoom lens according to Example 1 at an intermediate zoom position.
Figure 1C:
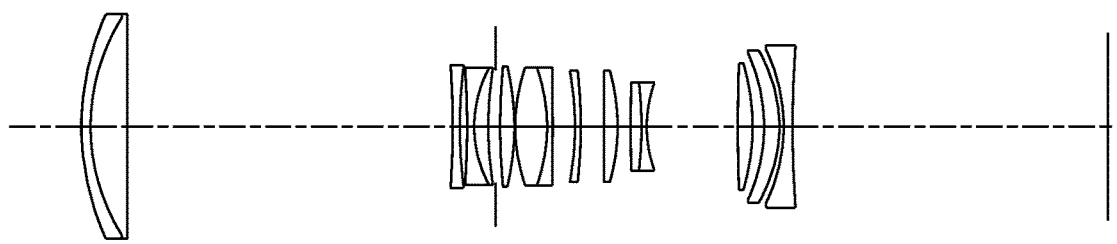
FIG. 1C is a lens cross-sectional view of the zoom lens according to Example 1 at a telephoto end.

FIG. 1A, FIG. 1B, and FIG. 1C are lens cross-sectional views of a zoom lens according to Example 1 of the present invention at a wide angle end (short focal length end), an intermediate zoom position, and a telephoto end (long focal length end), respectively. FIG. 2A, FIG. 2B, and FIG. 2C are aberration diagrams of the zoom lens according to Example 1 at the wide angle end, the intermediate zoom position, the telephoto end, respectively, when focused at infinity. Example 1 relates to a zoom lens having a zoom ratio of 4.11 and an F-number of from 3.94 to 5.83.

Figures 3A, 3B, 3C:
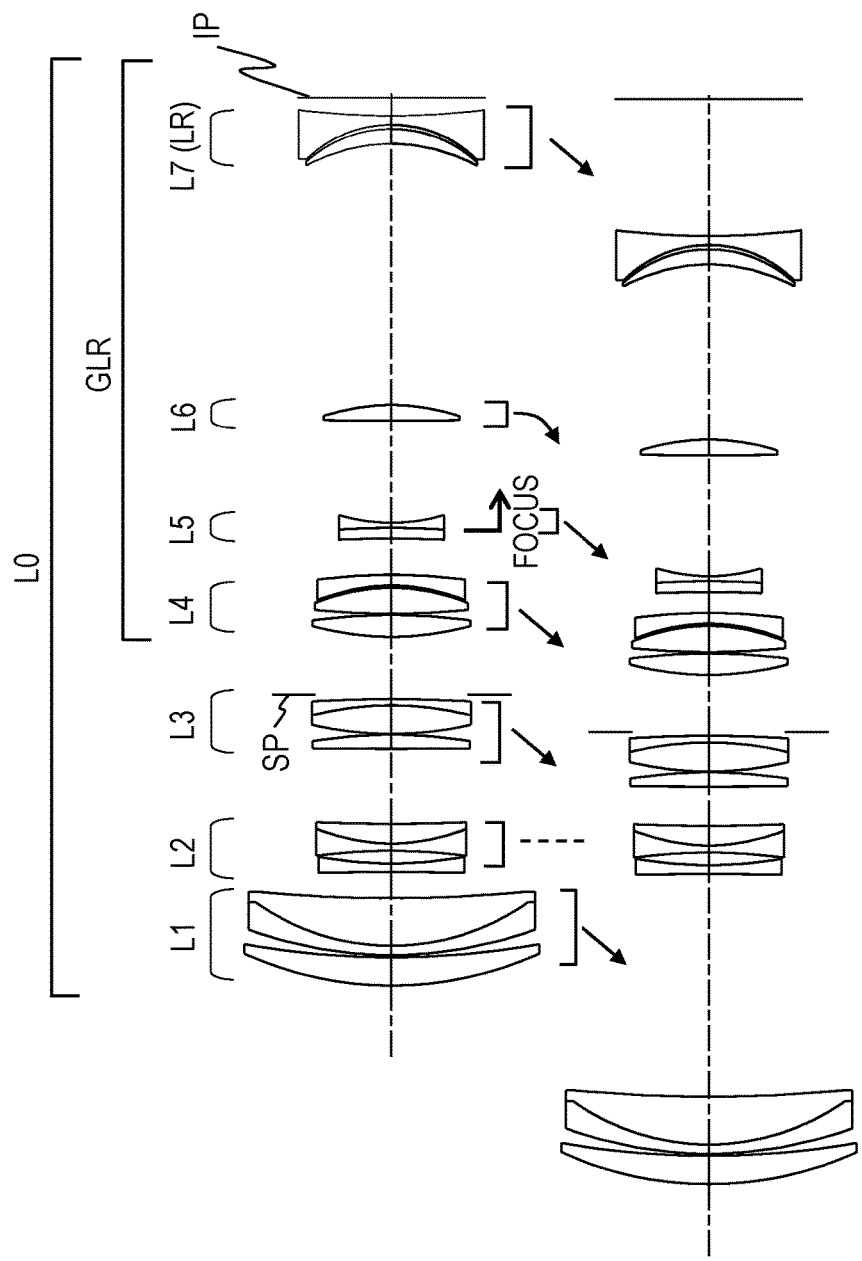
FIG. 3A is a lens cross-sectional view of a zoom lens according to Example 2 of the present invention at a wide angle end.
FIG. 3B is a lens cross-sectional view of the zoom lens according to Example 2 at an intermediate zoom position.
FIG. 3C is a lens cross-sectional view of the zoom lens according to Example 2 at a telephoto end.
Figure 4A:
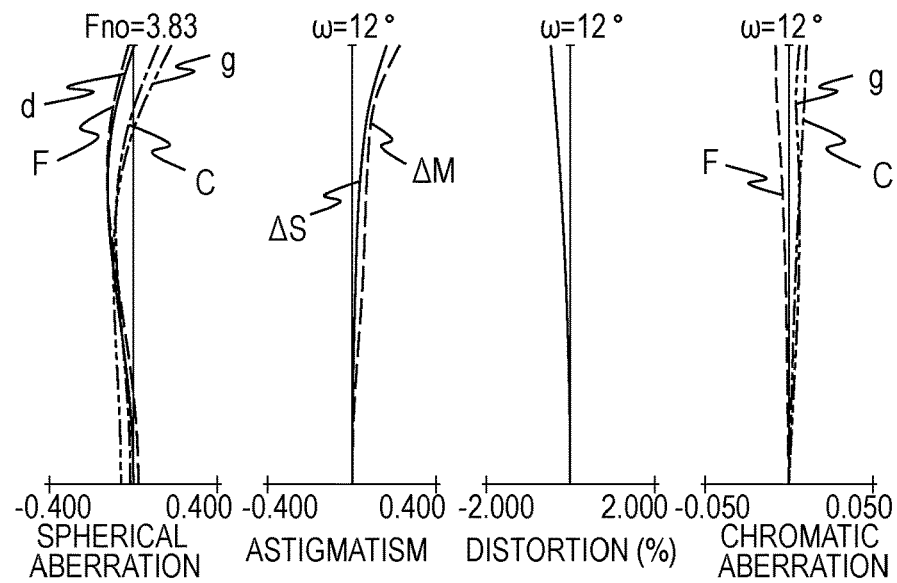
FIG. 4A is an aberration diagram of the zoom lens according to Example 2 at the wide angle end.
Figure 4B:
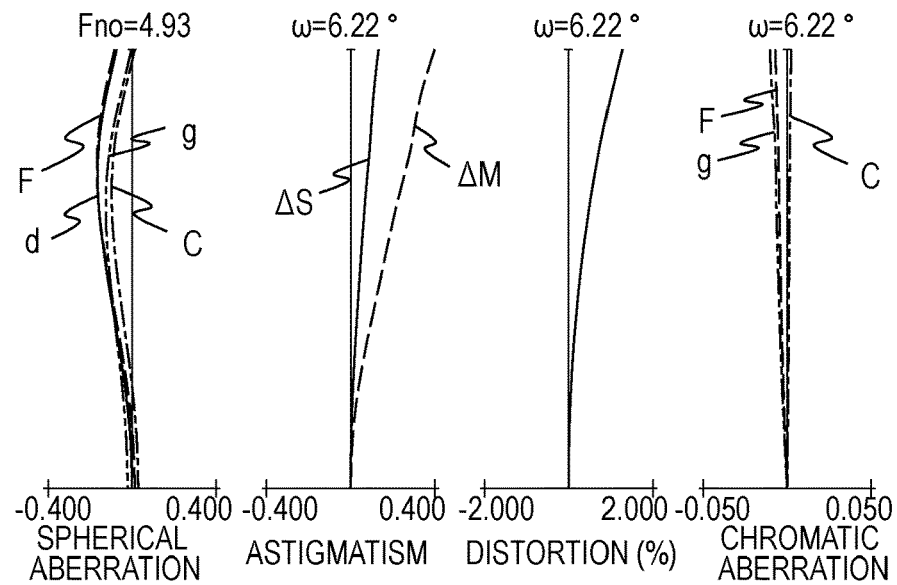
FIG. 4B is an aberration diagram of the zoom lens according to Example 2 at the intermediate zoom position.
Figure 4C:
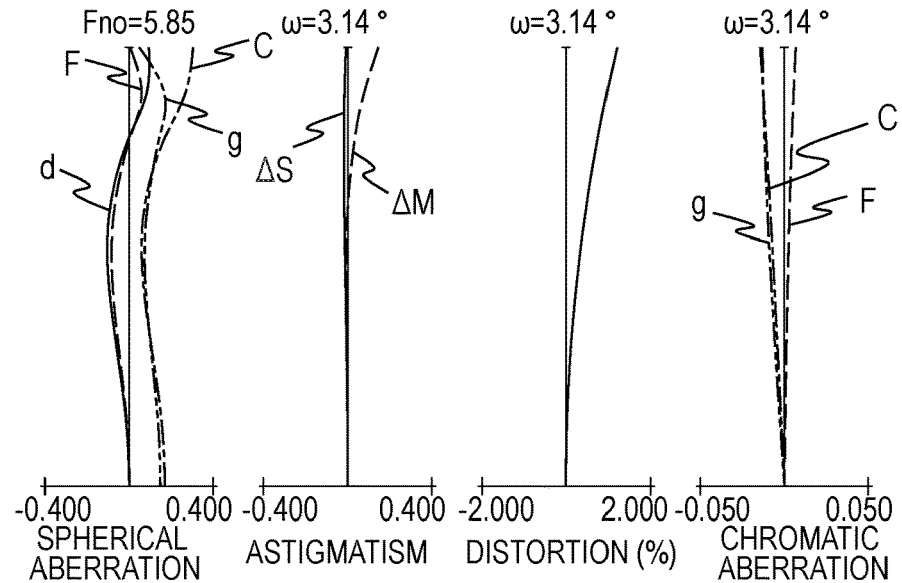
FIG. 4C is an aberration diagram of the zoom lens according to Example 2 at the telephoto end.

FIG. 3A, FIG. 3B, and FIG. 3C are lens cross-sectional views of a zoom lens according to Example 2 of the present invention at a wide angle end, an intermediate zoom position, and a telephoto end, respectively. FIG. 4A, FIG. 4B, and FIG. 4C are aberration diagrams of the zoom lens according to Example 2 at the wide angle end, the intermediate zoom position, the telephoto end, respectively, when focused at infinity. Example 2 relates to a zoom lens having a zoom ratio of 3.81 and an F-number of from 3.83 to 5.85.

Figure 5A:
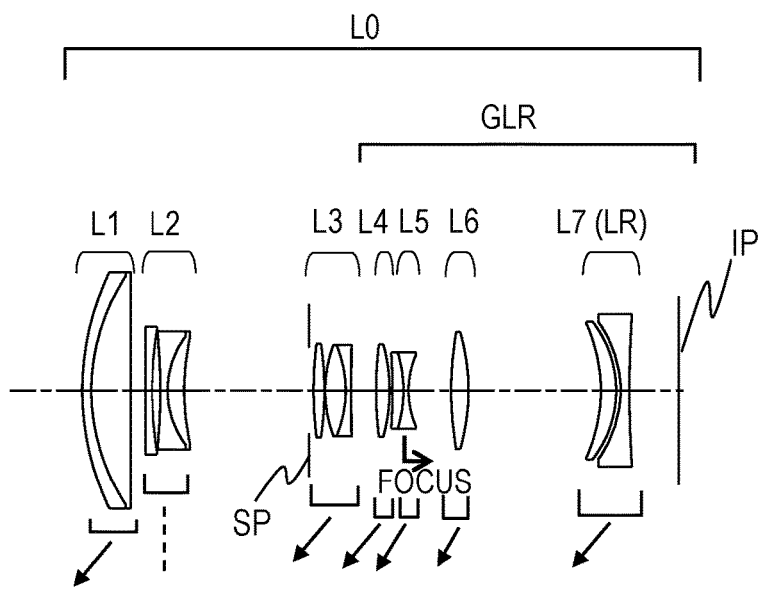
FIG. 5A is a lens cross-sectional view of a zoom lens according to Example 3 of the present invention at a wide angle end.
Figure 5B:
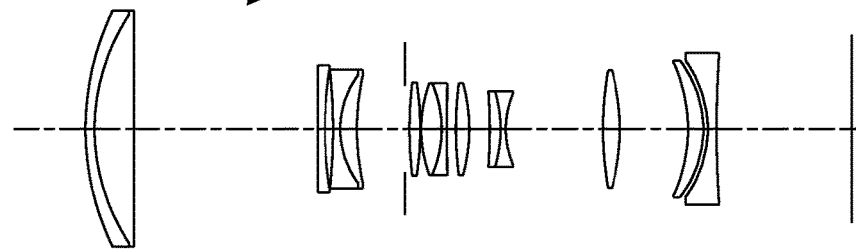
FIG. 5B is a lens cross-sectional view of the zoom lens according to Example 3 at an intermediate zoom position.
Figure 5C:
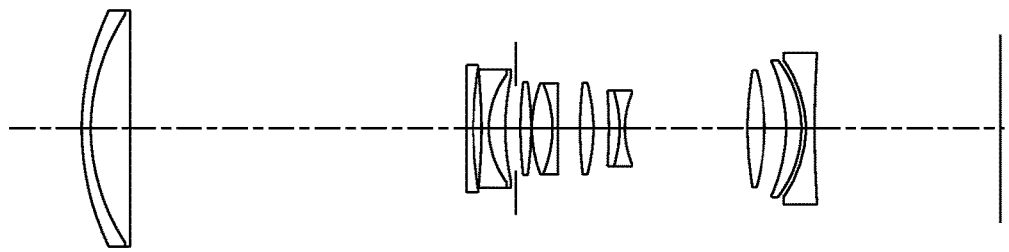
FIG. 5C is a lens cross-sectional view of the zoom lens according to Example 3 at a telephoto end.
Figure 6A:
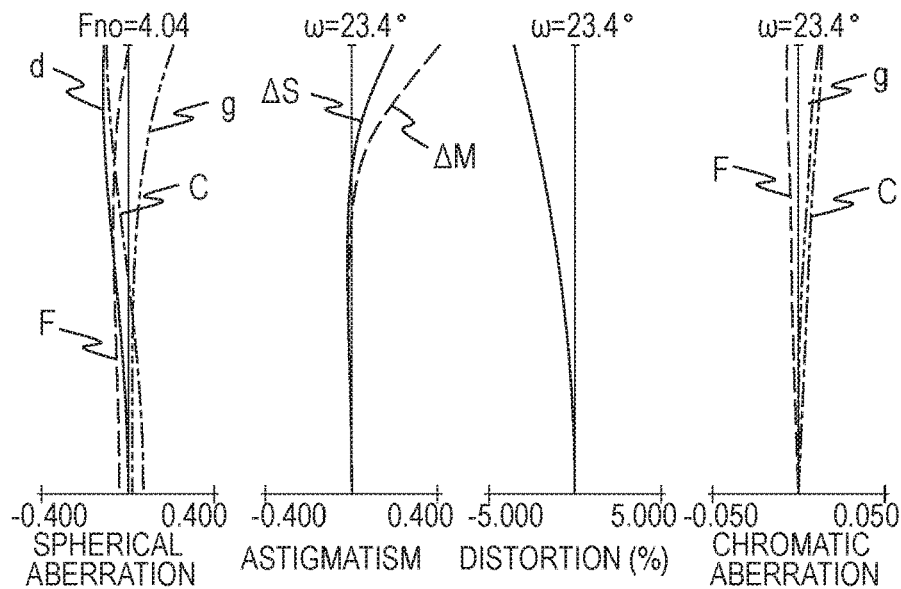
FIG. 6A is an aberration diagram of the zoom lens according to Example 3 at the wide angle end.
Figure 6B:
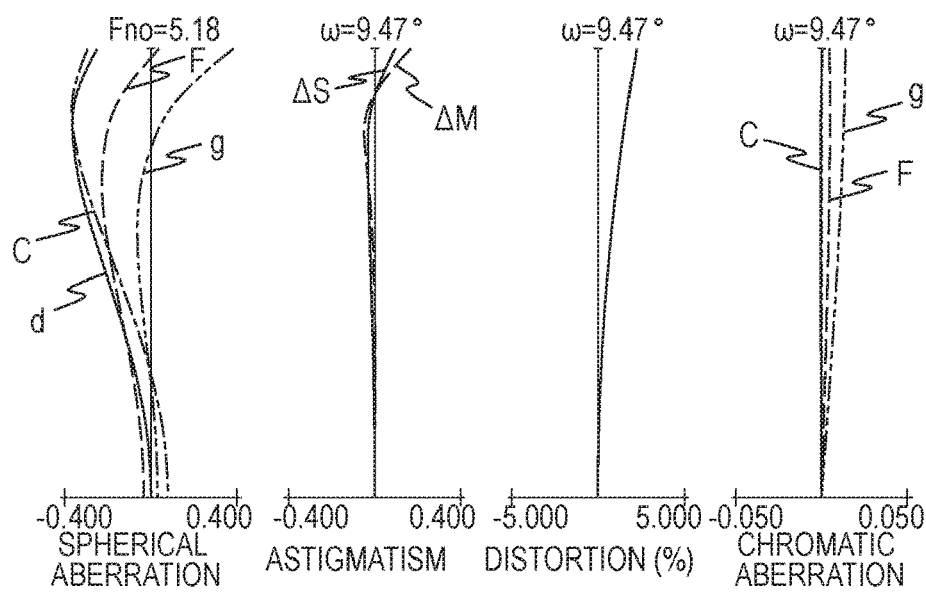
FIG. 6B is an aberration diagram of the zoom lens according to Example 3 at the intermediate zoom position.
Figure 6C:
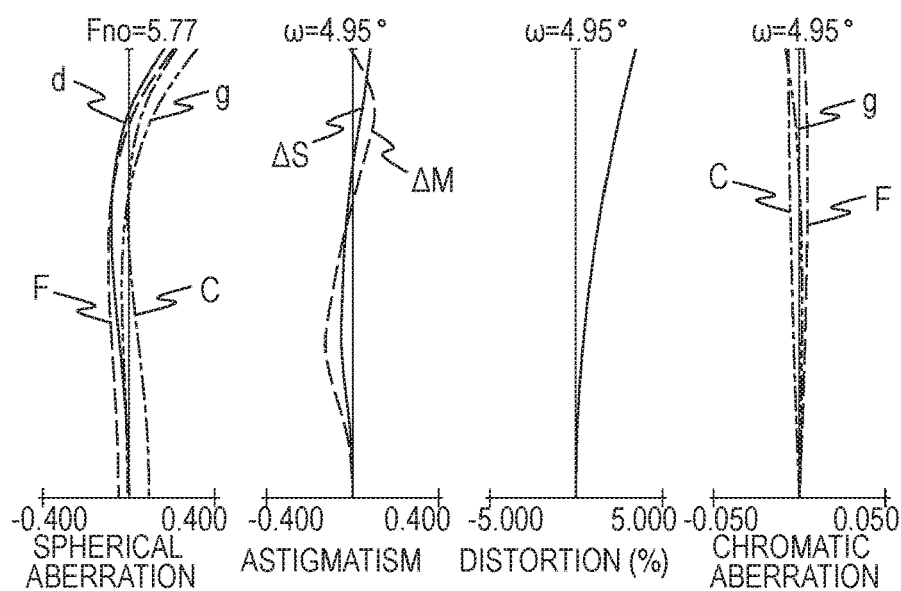
FIG. 6C is an aberration diagram of the zoom lens according to Example 3 at the telephoto end.

FIG. 5A, FIG. 5B, and FIG. 5C are lens cross-sectional views of a zoom lens according to Example 3 of the present invention at a wide angle end, an intermediate zoom position, and a telephoto end, respectively. FIG. 6A, FIG. 6B, and FIG. 6C are aberration diagrams of the zoom lens according to Example 3 at the wide angle end, the intermediate zoom position, the telephoto end, respectively, when focused at infinity. Example 3 relates to a zoom lens having a zoom ratio of 4.66 and an F-number of from 4.04 to 5.77.

Figure 7A:
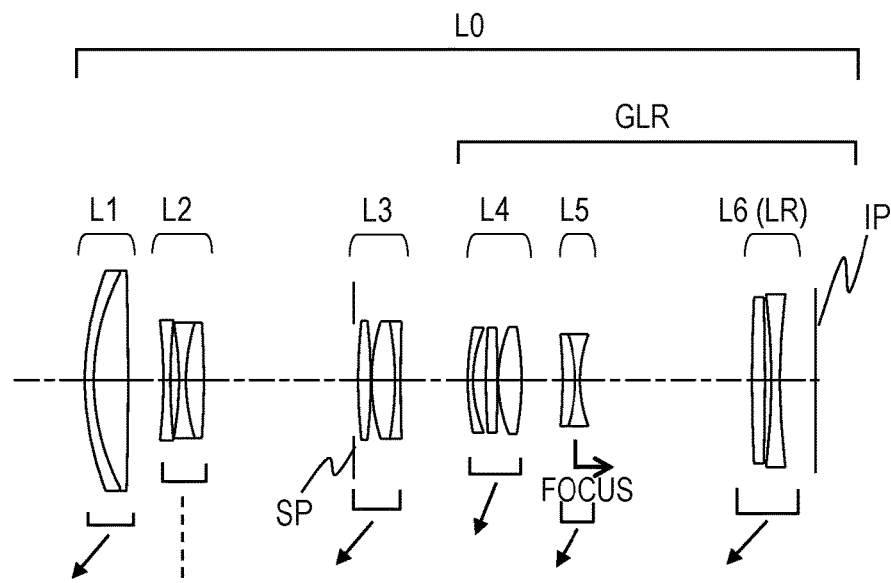
FIG. 7A is a lens cross-sectional view of a zoom lens according to Example 4 of the present invention at a wide angle end.
Figure 7B:
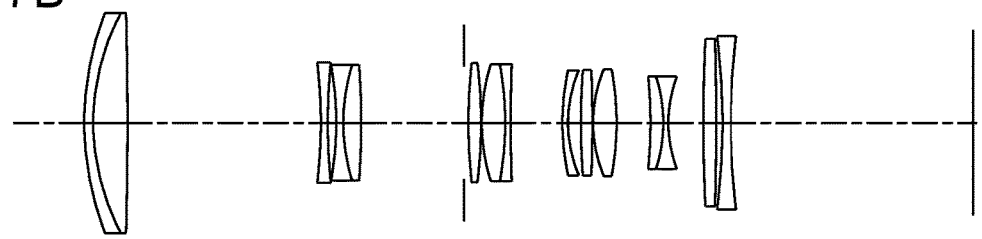
FIG. 7B is a lens cross-sectional view of the zoom lens according to Example 4 at an intermediate zoom position.
Figure 7C:
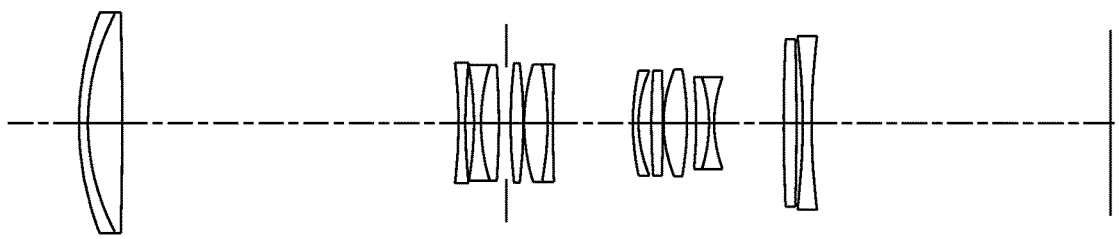
FIG. 7C is a lens cross-sectional view of the zoom lens according to Example 4 at a telephoto end.
Figure 8A:
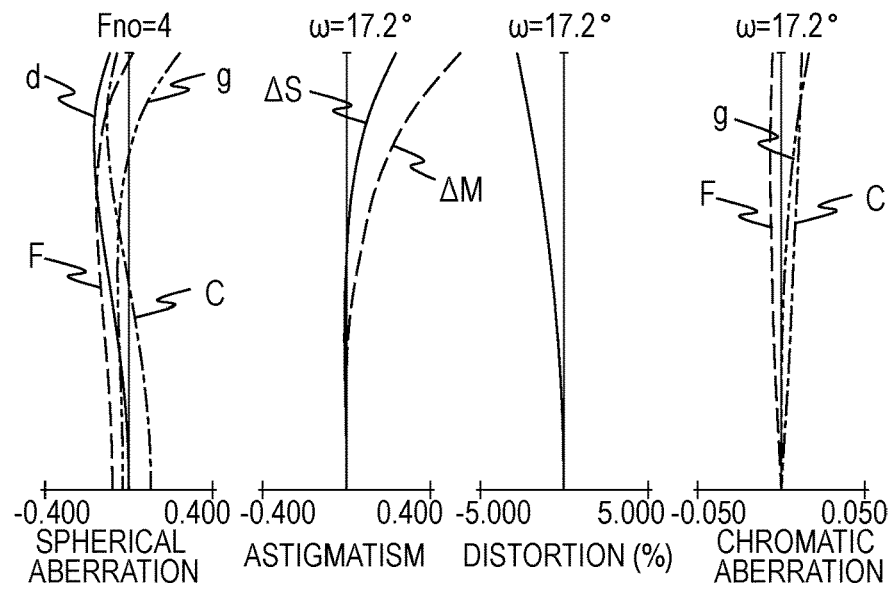
FIG. 8A is an aberration diagram of the zoom lens according to Example 4 at the wide angle end.
Figure 8B:
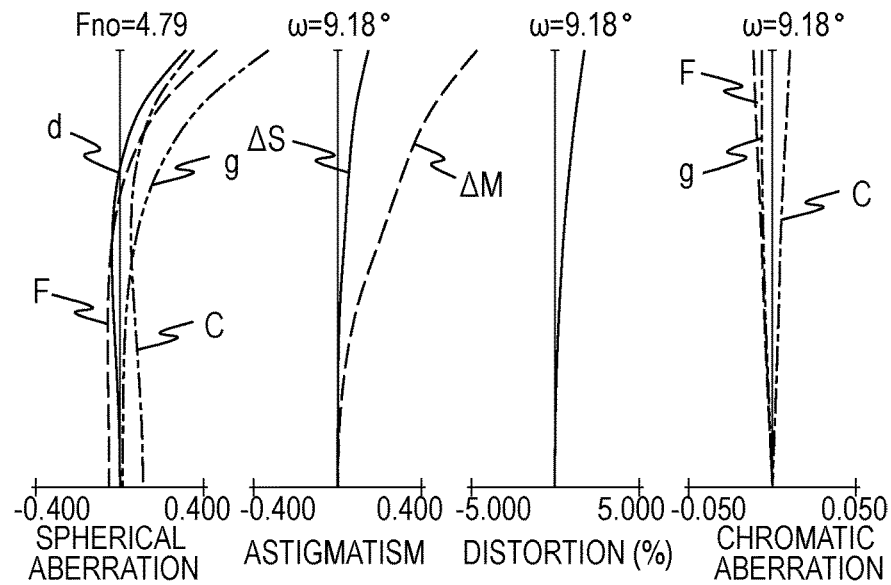
FIG. 8B is an aberration diagram of the zoom lens according to Example 4 at the intermediate zoom position.
Figure 8C:
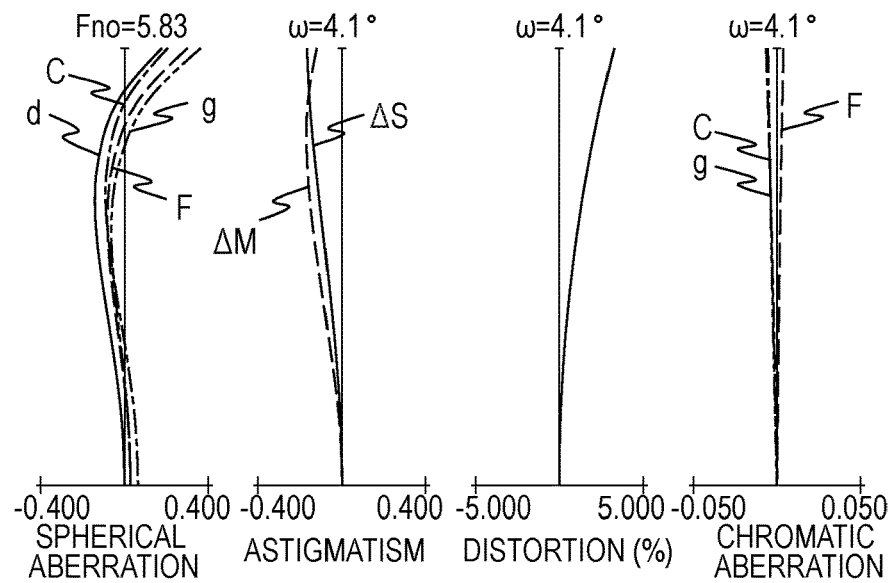
FIG. 8C is an aberration diagram of the zoom lens according to Example 4 at the telephoto end.

FIG. 7A, FIG. 7B, and FIG. 7C are lens cross-sectional views of a zoom lens according to Example 4 of the present invention at a wide angle end, an intermediate zoom position, and a telephoto end, respectively. FIG. 8A, FIG. 8B, and FIG. 8C are aberration diagrams of the zoom lens according to Example 4 at the wide angle end, the intermediate zoom position, the telephoto end, respectively, when focused at infinity. Example 4 relates to a zoom lens having a zoom ratio of 4.06 and an F-number of from 4.00 to 5.83.

Figure 9A:
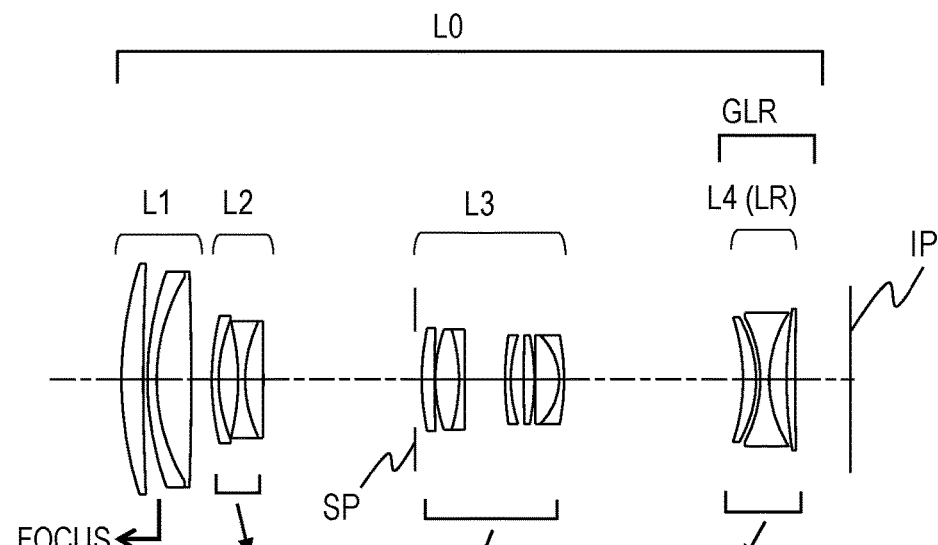
FIG. 9A is a lens cross-sectional view of a zoom lens according to Example 5 of the present invention at a wide angle end.
Figure 9B:
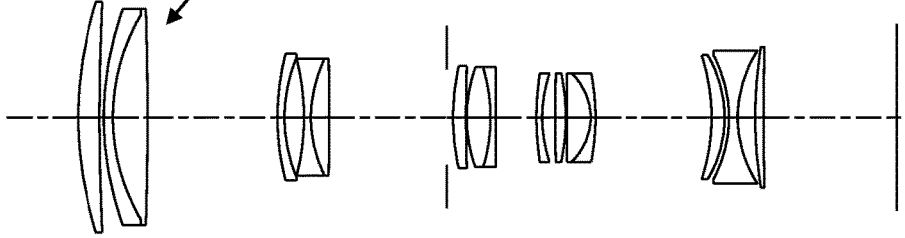
FIG. 9B is a lens cross-sectional view of the zoom lens according to Example 5 at an intermediate zoom position.
Figure 9C:
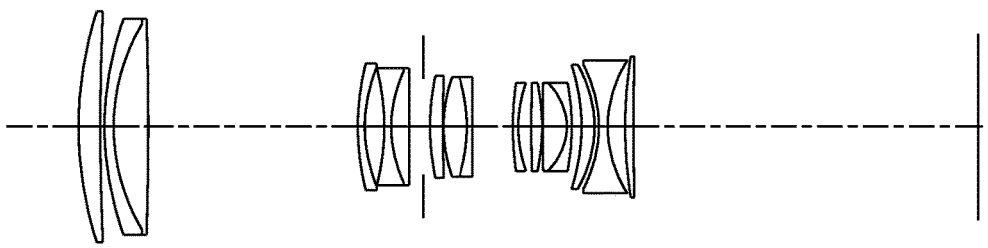
FIG. 9C is a lens cross-sectional view of the zoom lens according to Example 5 at a telephoto end.
Figure 10A:
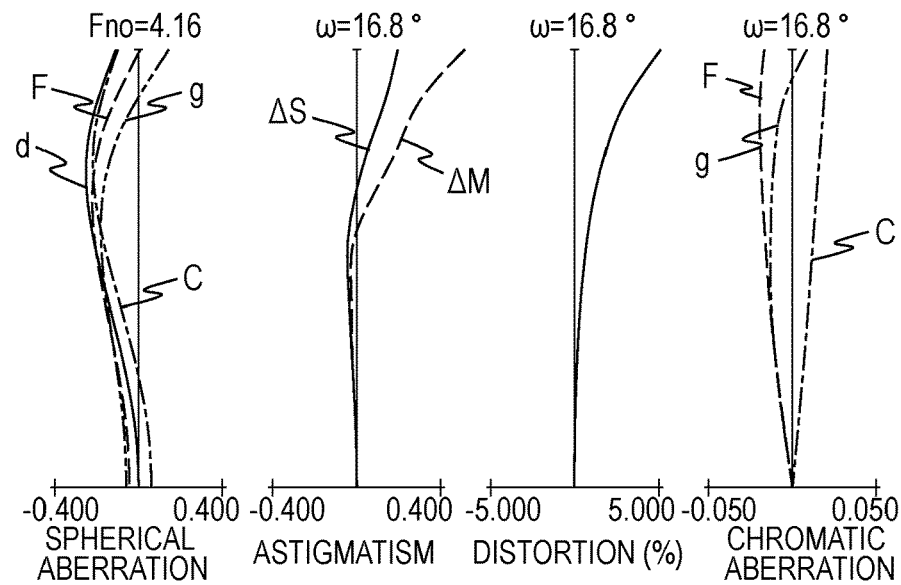
FIG. 10A is an aberration diagram of the zoom lens according to Example 5 at the wide angle end.
Figure 10B:
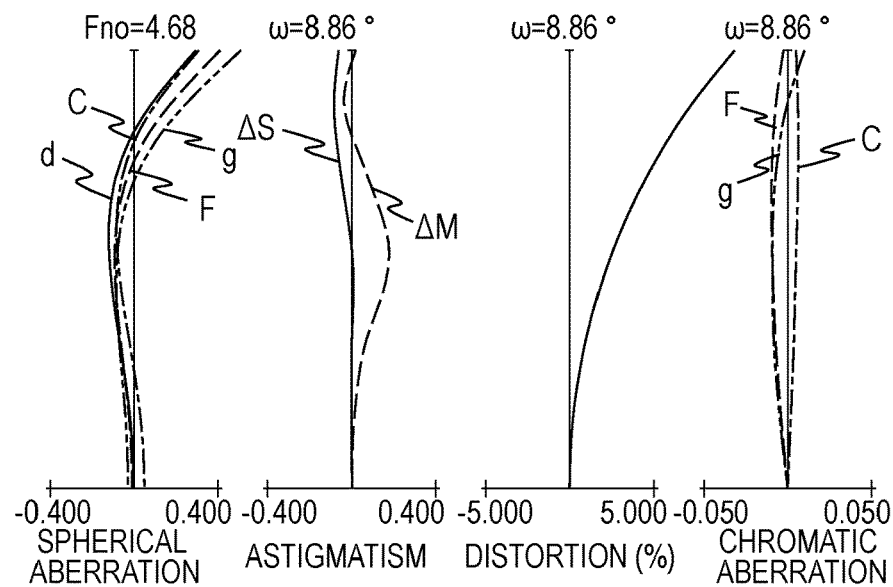
FIG. 10B is an aberration diagram of the zoom lens according to Example 5 at the intermediate zoom position.
Figure 10C:
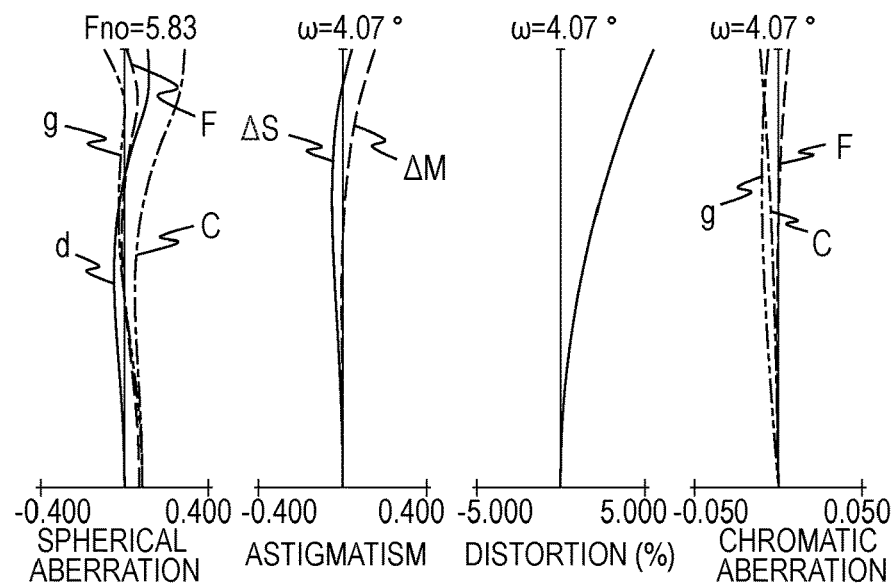
FIG. 10C is an aberration diagram of the zoom lens according to Example 5 at the telephoto end.

FIG. 9A, FIG. 9B, and FIG. 9C are lens cross-sectional views of a zoom lens according to Example 5 of the present invention at a wide angle end, an intermediate zoom position, and a telephoto end, respectively. FIG. 10A, FIG. 10B, and FIG. 10C are aberration diagrams of the zoom lens according to Example 5 at the wide angle end, the intermediate zoom position, the telephoto end, respectively, when focused at infinity. Example 5 relates to a zoom lens having a zoom ratio of 4.22 and an F-number of from 4.16 to 5.83.

Figure 11A:
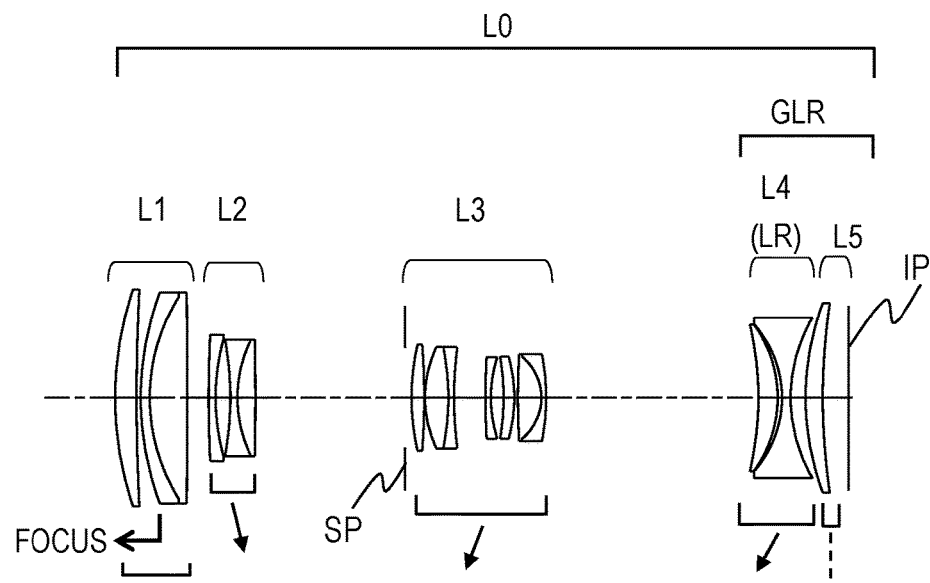
FIG. 11A is a lens cross-sectional view of a zoom lens according to Example 6 of the present invention at a wide angle end.
Figure 11B:
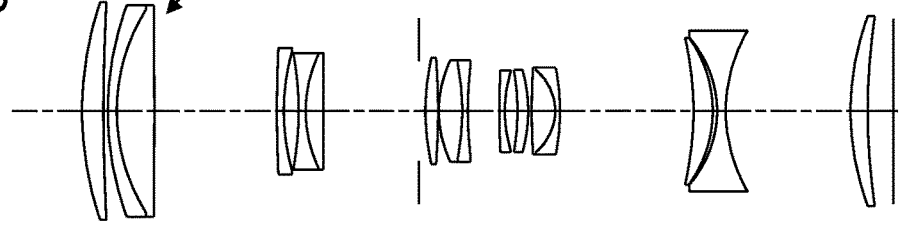
FIG. 11B is a lens cross-sectional view of the zoom lens according to Example 6 at an intermediate zoom position.
Figure 11C:
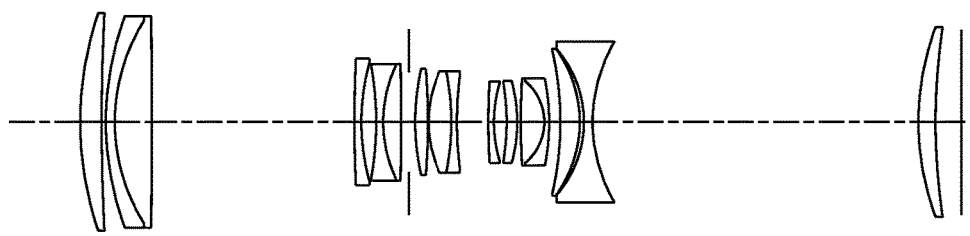
FIG. 11C is a lens cross-sectional view of the zoom lens according to Example 6 at a telephoto end.
Figure 12A:
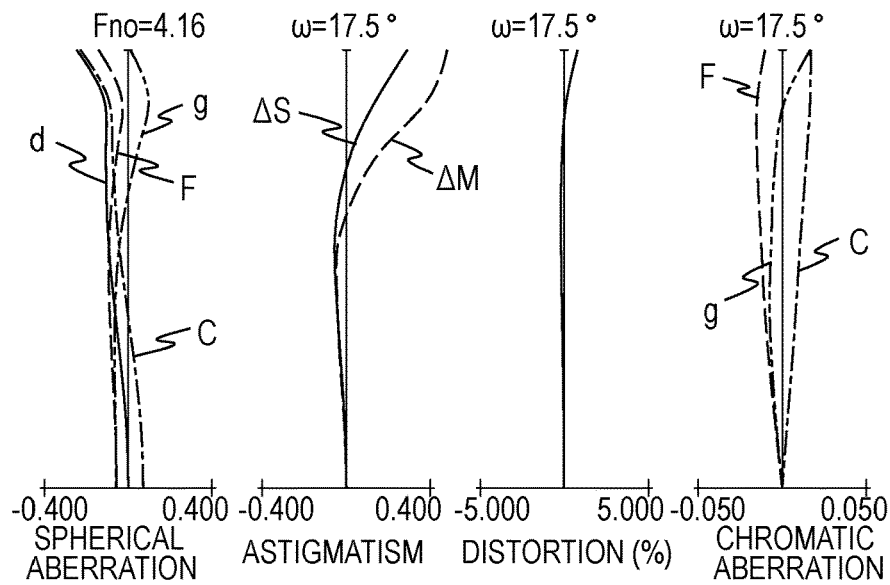
FIG. 12A is an aberration diagram of the zoom lens according to Example 6 at the wide angle end.
Figure 12B:
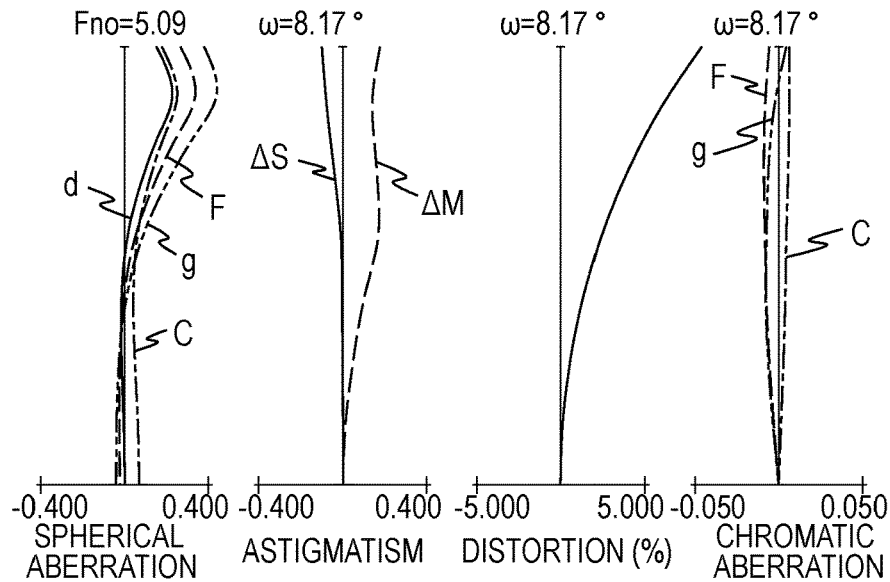
FIG. 12B is an aberration diagram of the zoom lens according to Example 6 at the intermediate zoom position.
Figure 12C:
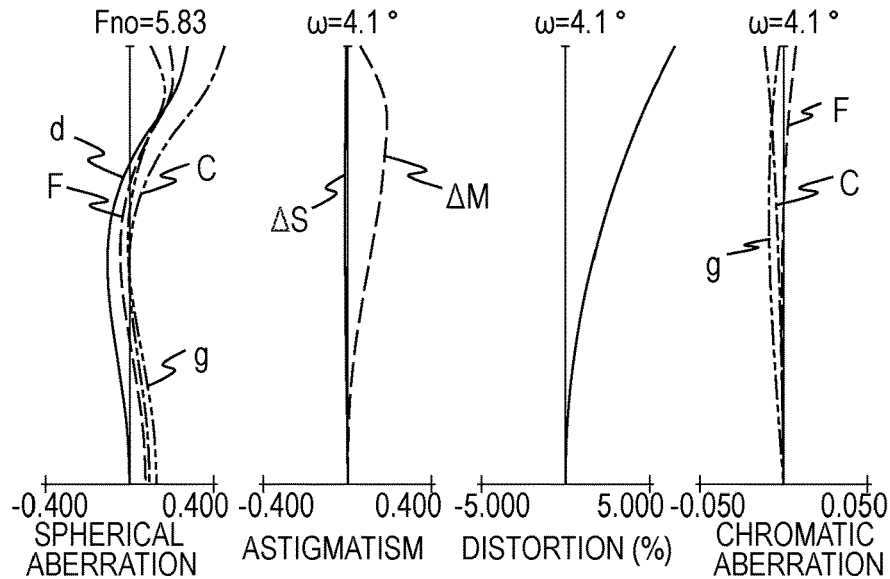
FIG. 12C is an aberration diagram of the zoom lens according to Example 6 at the telephoto end.

FIG. 11A, FIG. 11B, and FIG. 11C are lens cross-sectional views of a zoom lens according to Example 6 of the present invention at a wide angle end, an intermediate zoom position, and a telephoto end, respectively. FIG. 12A, FIG. 12B, and FIG. 12C are aberration diagrams of the zoom lens according to Example 6 at the wide angle end, the intermediate zoom position, the telephoto end, respectively, when focused at infinity. Example 6 relates to a zoom lens having a zoom ratio of 4.25 and an F-number of from 4.16 to 5.83.

Figure 13:
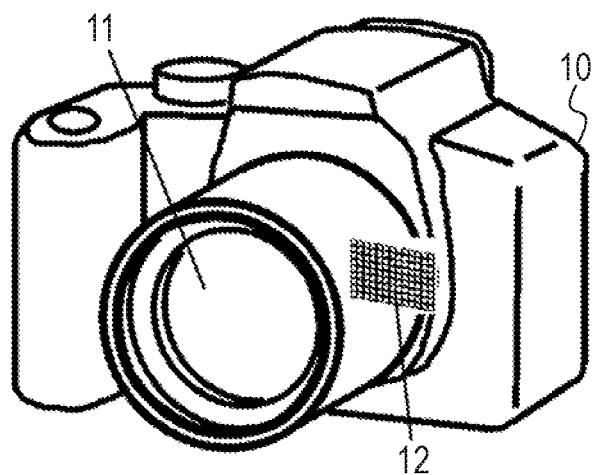
FIG. 13 is a schematic view of a main part of an image pickup apparatus according to one embodiment of the present invention.

FIG. 13 is a schematic view of a main part of an image pickup apparatus according to one embodiment of the present invention.

The zoom lens according to each of Examples is an image pickup optical system for use with an image pickup apparatus, for example, a video camera, a digital still camera, or a TV camera. The zoom lens according to each of Examples may also be used as a projection optical system for a projection device (projector). In the lens cross-sectional views, the left side is an object side (front side), and the right side is an image side (rear side). Moreover, in the lens cross-sectional views, a zoom lens is denoted by L0. When the order of a lens unit from the object side is represented by "i", the i-th lens unit is denoted by Li.

A rear lens group GLR includes one or more lens units. The rear lens group GLR includes a lens unit LR having a negative refractive power. The lens unit LR includes one or more positive lenses and one or more negative lenses.

An aperture stop SP determines (restricts) a light flux at the minimum F-number (Fno). As an image plane IP, an image pickup surface of a solid-state image pickup element (photoelectric conversion element), for example, a CCD sensor or a CMOS sensor, is placed when in use as a photographing optical system of a video camera or a digital still camera. The arrows indicate movement loci of the lens units during zooming from the wide angle end to the telephoto end.

The arrow regarding focus indicates a movement direction of a lens unit during focusing from infinity to a close distance.

In each of Examples 1 to 3, a first lens unit having a positive refractive power is denoted by L1, a second lens unit having a negative refractive power is denoted by L2, and a third lens unit having a positive refractive power is denoted by L3. A fourth lens unit having a positive refractive power is denoted by L4, a fifth lens unit having a negative refractive power is denoted by L5, a sixth lens unit having a positive refractive power is denoted by L6, and a seventh lens unit having a negative refractive power is denoted by L7. The rear lens group GLR consists of the fourth lens unit L4 to the seventh lens unit L7. The seventh lens unit L7 corresponds to the lens unit LR.

In the zoom lens according to each of Examples 1 to 3, during zooming from the wide angle end to the telephoto end, the first lens unit L1, the third lens unit L3, the fourth lens unit L4, the fifth lens unit L5, the sixth lens unit L6, and the seventh lens unit L7 (LR) are configured to move monotonously toward the object side. The second lens unit L2 is configured not to move. Zooming is performed such that an interval between the first lens unit L1 and the second lens unit L2 is larger, an interval between the second lens unit L2 and the third lens unit L3 is smaller, and an interval between the sixth lens unit L6 and the seventh lens unit L7 (LR) is smaller at the telephoto end than at the wide angle end.

In Example 4, a first lens unit having a positive refractive power is denoted by L1, a second lens unit having a negative refractive power is denoted by L2, and a third lens unit having a positive refractive power is denoted by L3. A fourth lens unit having a positive refractive power is denoted by L4, a fifth lens unit having a negative refractive power is denoted by L5, and a sixth lens unit having a negative refractive power is denoted by L6. The rear lens group GLR consists of the fourth lens unit L4 to the sixth lens unit L6. The sixth lens unit L6 corresponds to the lens unit LR.

In the zoom lens according to Example 4, during zooming from the wide angle end to the telephoto end, the first lens unit L1, the third lens unit L3, the fourth lens unit L4, the fifth lens unit L5, and the sixth lens unit L6 (LR) are configured to move monotonously toward the object side. The second lens unit L2 is configured not to move. Zooming is performed such that an interval between the first lens unit L1 and the second lens unit L2 is larger, an interval between the second lens unit L2 and the third lens unit L3 is smaller, and an interval between the fifth lens unit L5 and the sixth lens unit L6 (LR) is smaller at the telephoto end than at the wide angle end.

In Example 5, a first lens unit having a positive refractive power is denoted by L1, a second lens unit having a negative refractive power is denoted by L2, a third lens unit having a positive refractive power is denoted by L3, and a fourth lens unit having a negative refractive power is denoted by L4. The rear lens group GLR consists of the fourth lens unit L4. The fourth lens unit L4 corresponds to the lens unit LR.

In the zoom lens according to Example 5, during zooming from the wide angle end to the telephoto end, the first lens unit L1, the third lens unit L3, and the fourth lens unit L4 are configured to move monotonously toward the object side. The second lens unit L2 is configured to move toward the image side. Further, zooming is performed such that an interval between the first lens unit L1 and the second lens unit L2 is larger, and an interval between the second lens unit L2 and the third lens unit L3 and an interval between the third lens unit L3 and the fourth lens unit L4 (LR) are smaller at the telephoto end than at the wide angle end.

In Example 6, a first lens unit having a positive refractive power is denoted by L1, a second lens unit having a negative refractive power is denoted by L2, a third lens unit having a positive refractive power is denoted by L3, a fourth lens unit having a negative refractive power is denoted by L4, and a fifth lens unit having a positive refractive power is denoted by L5. The rear lens group GLR consists of the fourth lens unit L4 and the fifth lens unit L5. The fourth lens unit L4 corresponds to the lens unit LR.

In the zoom lens according to Example 6, during zooming from the wide angle end to the telephoto end, the first lens unit L1, the third lens unit L3, and the fourth lens unit L4 are configured to move monotonously toward the object side. The second lens unit L2 is configured to move toward the image side. The fifth lens unit L5 is configured not to move. Further, zooming is performed such that an interval between the first lens unit L1 and the second lens unit L2 is larger, and an interval between the second lens unit L2 and the third lens unit L3 and an interval between the third lens unit L3 and the fourth lens unit L4 (LR) are smaller at the telephoto end than at the wide angle end.

In each of Examples 1 to 3, the third lens unit L3, the fourth lens unit L4, and the fifth lens unit L5 may be integrated and configured to move integrally during zooming. In Example 4, the third lens unit L3, the fourth lens unit L4, and the fifth lens unit L5 may be integrated and configured to move integrally during zooming.

Moreover, in each of Examples, the second lens unit L2 may be configured to move in a direction having a component in a direction perpendicular to the optical axis during image blur correction, to thereby function as an image stabilizing optical system for correction.

In each of Examples 1 to 5, the lens unit LR is arranged closest to the image side in the rear lens group GLR.

In the aberration diagrams, an F-number is represented by Fno. A half angle of view (degrees) is represented by "ω", and is an angle of field in ray tracing value. In the spherical aberration diagrams, a solid line "d" indicates a d-line (wavelength: 587.56 nm), a two-dot chain line "g" indicates a g-line (wavelength: 435.835 nm), a one-dot chain line C indicates a C-line (wavelength: 656.27 nm), and a broken line F indicates an F-line (wavelength: 486.13 nm). In the astigmatism diagrams, a solid line ΔS indicates a sagittal image plane with respect to the d-line, and a broken line ΔM indicates a meridional image plane with respect to the d-line. The distortion is depicted for the d-line. In the lateral chromatic aberration diagrams, a two-dot chain line "g" indicates a g-line, a one-dot chain line C indicates a C-line, and a broken line F indicates an F-line.

The zoom lens according to each of Examples includes, in order from the object side to the image side, the first lens unit L1 having the positive refractive power, the second lens unit L2 having the negative refractive power, the third lens unit L3 having the positive refractive power, and the rear lens group GLR including the one or more lens units. Further, the interval between each pair of adjacent lens units is changed during zooming.

The rear lens group GLR includes the lens unit LR having the negative refractive power, and the lens unit LR includes the one or more positive lenses and the one or more negative lenses. A negative lens made of a material having the largest Abbe number of the one or more negative lenses included in the lens unit LR is defined as a negative lens LRN. Further, an extraordinary partial dispersion ratio of the material of the negative lens LRN is represented by $\Delta\theta gF$. At this time, the following conditional expression is satisfied:

$$0.0 < \Delta\theta gF < 0.3 \quad (1).$$

A distance from a lens surface on the image side of the lens unit LR to the image plane at the telephoto end is represented by "bft", a distance from the lens surface on the image side of the lens unit LR to the image plane at the wide angle end is represented by "bfw", and a focal length of the lens unit LR is represented by "fr". At this time, the following conditional expressions are satisfied:

$$3.5 < bft/bfw < 50.0 \quad (2); \text{ and}$$

$$-100.0 < fr/bfw < -5.0 \quad (3).$$

An Abbe number vd, a partial dispersion ratio θgF, and an extraordinary partial dispersion ratio (extraordinary partial dispersion property) ΔθgF of the material are expressed by expressions provided below.

Refractive indices of the material with respect to the g-line, the F-line, the d-line, and the C-line are represented by ng, nd, nF, and nC, respectively. At this time, the Abbe number vd, a partial dispersion ratio θgF, and the extraordinary partial dispersion ratio ΔθgF are expressed by the following expressions:

$$vd = (nd-1)/(nF-nC)$$

$$\theta gF = (ng-nF)/(nF-nC)$$

$$\Delta\theta gF = \theta gF - (-1.665 \times 10^{-7} \times vd^3 + 5.213 \times 10^{-5} \times vd^2 - 5.656 \times 10^{-3} \times vd + 0.7278)$$

Next, technical meanings of the above-mentioned conditional expressions are described.

The conditional expression (1) relates to the extraordinary partial dispersion ratio of the material of the negative lens LRN included in the lens unit LR. In order to reduce the total length of the zoom lens, when the zoom lens has a lens structure including, in order from the object side to the image side, the first lens unit to the third lens unit having the positive, negative, and positive refractive powers, in which the rear lens group on the image side of the first lens unit to the third lens unit has the negative refractive power, lateral chromatic aberration of the g-line is generated on the side of under-correction at the telephoto end.

In general, in a zoom lens of a telephoto type, it is often required to have satisfactory optical performance at the telephoto end. Therefore, the material having the extraordinary partial dispersion property, that is, the material having ΔθgF that is larger than 0 is used for the negative lens LRN included in the lens unit LR to satisfactorily correct chromatic aberration at the telephoto end, which is increased with the reduction in total length of the zoom lens.

When ΔθgF falls below the lower limit value of the conditional expression (1), it becomes difficult to correct lateral chromatic aberration at the telephoto end. On the other hand, when ΔθgF exceeds the upper limit value of the conditional expression (1), it becomes difficult to correct axial chromatic aberration and lateral chromatic aberration at the wide angle end and the telephoto end.

The conditional expression (2) is intended to appropriately set a ratio of the distance from the last lens surface of the lens unit LR to the image plane at the telephoto end to the distance from the last lens surface of the lens unit LR to the image plane at the wide angle end.

As described above, when the material that satisfies ΔθgF>0 is used for the negative lens LRN included in the lens unit LR, lateral chromatic aberration of the g-line is generated on the side of over-correction at the wide angle end. According to the paraxial theory, lateral chromatic aberration is proportional to a product of an incidence height of a paraxial axial ray and an incidence height of a pupil paraxial ray. Under this theory, the lens unit LR is arranged near the image plane, at which the incidence height of the pupil paraxial ray is high and the incidence height of the paraxial axial ray is low, to reduce the effect.

Further, the lens unit LR is arranged at a position away from the image plane, at which the product of the incidence height of the paraxial axial ray and the incidence height of the pupil paraxial ray is increased, to correct lateral chromatic aberration at the telephoto end. Moreover, the lens unit LR is configured to effectively correct various aberrations generated by the lens units on the front side of the lens unit LR at the telephoto end.

The "paraxial axial ray" as used herein refers to a paraxial ray obtained when a focal length of an entire optical system is normalized to 1, and when light having a incidence height from the optical axis of 1 is allowed to enter parallel to the optical axis of the optical system.

Moreover, the "pupil paraxial ray" refers to, when the focal length of the entire optical system is normalized to 1, of a ray that enters at −45° with respect to the optical axis, a paraxial ray that passes an intersection point of an entrance pupil and the optical axis of the optical system. Here, an angle of incidence on the optical system is positive in a clockwise direction and negative in a counterclockwise direction when measured from the optical axis.

When the ratio falls below the lower limit value of the conditional expression (2), lateral chromatic aberration is increased at the wide angle end, or it becomes difficult to correct lateral chromatic aberration at the telephoto end. On the other hand, when the ratio exceeds the upper limit value of the conditional expression (2), the distance from the last lens surface of the lens unit LR to the image plane at the telephoto end becomes much longer, and hence it becomes difficult to correct lateral chromatic aberration at the telephoto end.

The conditional expression (3) is intended to appropriately set the ratio between the distance from the last lens surface of the lens unit LR to the image plane at the wide angle end and the focal length of the lens unit LR. When the ratio falls below the lower limit value of the conditional expression (3), the negative refractive power of the lens unit LR becomes weaker (absolute value of the negative refractive power becomes smaller), and hence it becomes difficult to reduce the total length of the zoom lens. On the other hand, when the ratio exceeds the upper limit value of the conditional expression (3), the negative focal length of the lens unit LR becomes shorter (negative refractive power becomes stronger), and hence an angle of incidence of an off-axial ray on the image plane becomes larger. Then, shading is disadvantageously generated, for example, under the effect of characteristics of obliquely incident light on an image pickup element.

In each of Examples, it is further preferred to set the numerical value ranges of the conditional expressions (1) to (3) as follows.

$$0.01<\Delta\theta gF<0.10 \quad (1a)$$

$$3.6<bft/bfw<30.0 \quad (2a)$$

$$-80.0<fr/bfw<-5.0 \quad (3a)$$

It is further preferred to set the numerical value ranges of the conditional expressions (1a) to (3a) as follows.

$$0.01<\Delta\theta gF<0.03 \quad (1b)$$

$$3.7<bft/bfw<25.0 \quad (2b)$$

$$-60.0<fr/bfw<-5.0 \quad (3b)$$

In each of Examples, it is preferred to satisfy one or more of conditional expressions provided below. A total length of the zoom lens at the telephoto end is represented by TLt, and a movement amount of the lens unit LR during zooming from the wide angle end to the telephoto end is represented by Mr. The "movement amount of the lens unit" as used herein refers to a difference between a position on the optical axis of the lens unit at the wide angle end and a position on the optical axis of the lens unit at the telephoto end. The movement amount has a positive sign when the lens unit is located closer to the image side at the telephoto end than at the wide angle end, and has a negative sign when the lens unit is located closer to the object side at the telephoto end than at the wide angle end.

An effective diameter of the lens surface closest to the image side of the lens unit LR is represented by "ear". A focal length of the negative lens LRN is represented by "frn". An interval on the optical axis between the second lens unit L2 and the third lens unit L3 at the wide angle end is represented by D23w, and a lens interval between the second lens unit L2 and the third lens unit L3 at the telephoto end is represented by D23t. A focal length of the zoom lens at the wide angle end is represented by "fw". A focal length of the zoom lens at the telephoto end is represented by "ft". A focal length of the first lens unit is represented by f1. Lateral magnifications of the lens unit LR at the wide angle end and the telephoto end when focused at infinity are represented by "βrw" and "βrt", respectively.

$$-10.0<TLt/Mr<-2.0 \quad (4)$$

$$2.0<ear/bfw<10.0 \quad (5)$$

$$-3.0<frn/bfw<-2.0 \quad (6)$$

$$2.0<D23w/D23t<20.0 \quad (7)$$

$$4.0<fw/bfw<25.0 \quad (8)$$

$$3.0<ft/bft<6.0 \quad (9)$$

$$0.2<f1/ft<1.1 \quad (10)$$

$$1.0\leq\beta rt/\beta rw<2.5 \quad (11)$$

Next, technical meanings of the above-mentioned conditional expressions are described.

The conditional expression (4) is intended to appropriately set a ratio of the total length of the zoom lens at the telephoto end to the movement amount of the lens unit LR during zooming from the wide angle end to the telephoto end. When the ratio exceeds the upper limit value of the conditional expression (4), the movement amount of the lens unit LR becomes much larger, and it becomes difficult to correct lateral chromatic aberration at the telephoto end. On the other hand, when the ratio falls below the lower limit value of the conditional expression (4), the movement amount of the lens unit LR becomes smaller, and it becomes difficult to correct lateral chromatic aberration and spherical aberration at the telephoto end, for example. Moreover, when the ratio of the conditional expression (4) takes a positive value, the lens unit LR is moved toward the image side during zooming from the wide angle end to the telephoto end, and hence it becomes difficult to correct lateral chromatic aberration at the telephoto end.

The conditional expression (5) is intended to appropriately set a ratio of the effective diameter of the lens surface closest to the image side of the lens unit LR to the distance from the last lens surface of the lens unit LR to the image plane at the wide angle end. When the ratio exceeds the upper limit value of the conditional expression (5), the effective diameter of the lens surface closest to the image side of the lens unit LR is increased, and the optical system is disadvantageously increased in size.

On the other hand, when the ratio falls below the lower limit value of the conditional expression (5), the distance from the last lens surface of the lens unit LR to the image plane at the wide angle end becomes much longer, and hence it becomes difficult to correct lateral chromatic aberration at the wide angle end. In other words, the effective diameter of the lens surface closest to the image side of the lens unit LR becomes much smaller, and hence shading is disadvantageously generated, for example, under the effect of the obliquely incident light characteristics of the light flux on the image pickup element.

The conditional expression (6) is intended to appropriately set a ratio of the focal length of the negative lens LRN that satisfies the conditional expression (1) and is included in the lens unit LR to the distance from the last lens surface of the lens unit LR to the image plane at the wide angle end. When the ratio exceeds the upper limit value of the conditional expression (6), the distance from the last lens surface of the lens unit LR to the image plane at the wide angle end becomes longer, or the negative focal length of the negative lens LRN included in the lens unit LR becomes shorter (negative refractive power becomes stronger). Then, it becomes difficult to correct various aberrations including chromatic aberration.

On the other hand, when the ratio falls below the lower limit value of the conditional expression (6), the negative focal length of the negative lens LRN included in the lens unit LR becomes much longer (negative refractive power becomes weaker). Then, it becomes difficult to correct lateral chromatic aberration at the telephoto end.

The conditional expression (7) is intended to appropriately set a ratio between air intervals on the optical axis between the second lens unit L2 and the third lens unit L3 at the wide angle end and the telephoto end. When the ratio exceeds the upper limit value of the conditional expression (7), the total length of the zoom lens at the wide angle end becomes longer, and it becomes difficult to downsize the zoom lens. On the other hand, when the ratio falls below the lower limit value of the conditional expression (7), the total length of the zoom lens at the telephoto end becomes longer, and further, an effective diameter of a front lens becomes larger, with the result that the zoom lens is disadvantageously increased in size.

The conditional expression (8) is intended to appropriately set a ratio of the focal length of the zoom lens at the wide angle end to the distance from the last lens surface of the lens unit LR to the image plane at the wide angle end. When the ratio exceeds the upper limit value of the conditional expression (8), the distance from the last surface of the lens unit LR to the image plane at the wide angle end becomes shorter, and although it becomes easy to correct lateral chromatic aberration at the wide angle end, it becomes difficult to secure a back focus of a length required by the image pickup apparatus.

On the other hand, when the ratio falls below the lower limit value of the conditional expression (8), the distance from the last lens surface of the lens unit LR to the image plane at the wide angle end becomes much longer, and hence it becomes difficult to correct lateral chromatic aberration at the wide angle end.

The conditional expression (9) is intended to appropriately set a ratio of the focal length of the zoom lens at the telephoto end to the distance from the last lens surface of the lens unit LR to the image plane at the telephoto end. When the ratio exceeds the upper limit value of the conditional expression (9), the distance from the last lens surface of the lens unit LR to the image plane at the telephoto end becomes much shorter, and it becomes difficult to correct lateral chromatic aberration and spherical aberration at the telephoto end.

Further, a magnification-varying share of the lens unit LR is reduced, with the result that a magnification-varying load is disadvantageously placed on the lens units on the object side. On the other hand, when the ratio falls below the lower limit value of the conditional expression (9), the distance from the last lens surface of the lens unit LR to the image plane at the telephoto end becomes much longer, and it becomes difficult to correct lateral chromatic aberration at the telephoto end.

The conditional expression (10) is intended to appropriately set a ratio of the focal length of the first lens unit L1 to the focal length of the zoom lens at the telephoto end. When the ratio exceeds the upper limit value of the conditional expression (10), and the focal length of the first lens unit L1 becomes much longer, it becomes more likely that the total length of the zoom lens is increased, and it becomes difficult to downsize the zoom lens. On the other hand, when the ratio falls below the lower limit value of the conditional expression (10), and the focal length of the first lens unit L1 becomes much shorter, large various aberrations including spherical aberration are generated, and it becomes difficult to obtain high optical performance.

The conditional expression (11) relates to a change in lateral magnification of the lens unit LR during zooming from the wide angle end to the telephoto end. When the ratio exceeds the upper limit value of the conditional expression (11), the magnification-varying share of the lens unit LR becomes much larger, and it becomes difficult to obtain high optical performance. On the other hand, when the ratio falls below the lower limit value of the conditional expression (11), a magnification-varying share of the other lens units is increased, with the result that it becomes disadvantageously difficult to obtain high optical performance at the telephoto end, and that the total length of the zoom lens is disadvantageously increased.

It is further preferred to set the numerical value ranges of the conditional expressions (4) to (11) as follows.

$$-8.0 < TLt/Mr < -3.0 \tag{4a}$$

$$2.0 < ear/bfw < 9.8 \tag{5a}$$

$$-25.0 < frn/bfw < -2.2 \tag{6a}$$

$$2.5 < D23w/D23t < 15.0 \tag{7a}$$

$$4.2 < fw/bfw < 24.5 \tag{8a}$$

$$3.1 < ft/bft < 5.8 \tag{9a}$$

$$0.3 < f1/ft < 0.8 \tag{10a}$$

$$1.1 < \beta rt/\beta rw < 2.3 \tag{11a}$$

It is further preferred to set the numerical value ranges of the conditional expressions (4a) to (11a) as follows.

$$-7.0 < TLt/Mr < -3.0 \tag{4b}$$

$$2.2 < ear/bfw < 9.6 \tag{5b}$$

$$-23.0 < frn/bfw < -2.5 \tag{6b}$$

$$3.5 < D23w/D23t < 14.0 \tag{7b}$$

$$4.4 < fw/bfw < 24.0 \tag{8b}$$

$$3.2 < ft/bft < 5.7 \tag{9b}$$

$$0.35 < f1/ft < 0.70 \tag{10b}$$

$$1.12 < \beta rt/\beta rw < 2.10 \tag{11b}$$

Although the exemplary embodiments of the present invention have been described so far, the present invention is by no means limited to those embodiments, and hence various changes and modifications can be made within the scope of the subject matter of the present invention.

Next, a digital still camera (image pickup apparatus) according to one embodiment of the present invention, which uses the zoom lens according to each of Examples as an image pickup optical system, is described with reference to FIG. 13.

In FIG. 13, a camera main body 10, and an image pickup optical system 11 formed of the zoom lens described in one of Examples are illustrated. A solid-state image pickup element (photo-electric conversion element) 12 such as a CCD sensor or a CMOS sensor is included in the camera main body 10, and is configured to receive light of an object image formed by the image pickup optical system 11.

Numerical Data 1 to 6 respectively corresponding to Examples 1 to 6 are provided below. In each set of Numerical Data, the order of a surface as counted from the object side is represented by "i". A curvature radius of each surface is represented by "ri", a lens thickness and air interval between the i-th surface and the (i+1)th surface is represented by "di", and a refractive index and an Abbe number of an optical material between the i-th surface and the (i+1)th surface with respect to the d-line are represented by "ndi" and "vdi", respectively. Refractive indices of the optical material with respect to the g-line, the C-line, and the F-line are represented by ng, nC, and nF, respectively. A back focus is represented by BF.

An entrance pupil position is a distance from the lens surface (first lens surface) closest to the object side to the entrance pupil, an exit pupil position is a distance from the lens surface (last lens surface) closest to the image side to an exit pupil, and a front principal point position is a distance from the first lens surface to a front principal point. A rear principal point position is a distance from the last lens surface to a rear principal point, each numerical value is a paraxial amount, and a sign is positive for a direction from the object side to the image side. Moreover, relationships between the conditional expressions described above and Examples 1 to 6 are shown in Table 1.

[Numerical Data 1]

| Various data Zoom ratio 4.11 | | | |
|---|---|---|---|
| | Wide angle | Intermediate | Telephoto |
| Focal length | 71.40 | 136.34 | 293.23 |
| F-number | 3.94 | 4.72 | 5.83 |
| Half angle of view (degrees) | 16.86 | 9.02 | 4.22 |
| Image height | 21.64 | 21.64 | 21.64 |
| Total length of zoom lens | 165.00 | 202.23 | 235.83 |
| BF | 12.14 | 31.67 | 72.45 |
| d3 | 4.00 | 41.23 | 74.83 |
| d8 | 32.46 | 19.82 | 1.77 |
| d14 | 6.20 | 2.93 | 5.32 |
| d18 | 1.97 | 5.42 | 3.01 |
| d21 | 15.91 | 25.48 | 20.91 |
| d23 | 37.39 | 20.75 | 2.61 |
| d27 | 12.14 | 31.67 | 72.45 |
| Entrance pupil position | 43.20 | 110.32 | 187.19 |
| Exit pupil position | −52.03 | −55.02 | −48.17 |
| Front principal point position | 35.15 | 32.24 | −232.41 |
| Rear principal point position | −59.26 | −104.67 | −220.78 |

| Zoom lens unit data | | | | | |
|---|---|---|---|---|---|
| Unit | First surface | Focal length | Lens unit structure length | Front principal point position | Rear principal point position |
| 1 | 1 | 171.84 | 10.48 | −1.81 | −8.47 |
| 2 | 4 | −48.25 | 8.12 | 3.02 | −2.22 |
| 3 | 9 | 48.90 | 13.03 | −0.29 | −8.38 |
| 4 | 15 | 127.17 | 9.73 | 13.46 | 6.22 |

| | Unit: mm Surface data | | | | | | | |
|---|---|---|---|---|---|---|---|---|
| Surface number | r | d | nd | ng | nC | nF | vd | Effective diameter |
| 1 | 62.635 | 2.10 | 1.91082 | 1.94412 | 1.90323 | 1.92907 | 35.3 | 50.30 |
| 2 | 47.415 | 8.38 | 1.49700 | 1.50451 | 1.49514 | 1.50123 | 81.5 | 48.83 |
| 3 | 3,523.567 | (Variable) | | | | | | 48.48 |
| 4 | −208.214 | 1.60 | 1.60311 | 1.61541 | 1.60008 | 1.61002 | 60.6 | 27.18 |
| 5 | 105.615 | 1.72 | | | | | | 25.88 |
| 6 | −190.788 | 1.60 | 1.77250 | 1.79197 | 1.76780 | 1.78337 | 49.6 | 25.67 |
| 7 | 28.676 | 3.20 | 1.85478 | 1.90045 | 1.84488 | 1.87935 | 24.8 | 25.77 |
| 8 | 81.766 | (Variable) | | | | | | 25.79 |
| 9 (Stop) | ∞ | 0.98 | | | | | | 26.03 |
| 10 | 148.532 | 3.30 | 1.77250 | 1.79197 | 1.76780 | 1.78337 | 49.6 | 26.52 |
| 11 | −59.434 | 0.15 | | | | | | 26.63 |
| 12 | 41.363 | 7.34 | 1.49700 | 1.50451 | 1.49514 | 1.50123 | 81.5 | 26.03 |
| 13 | −40.190 | 1.25 | 2.00100 | 2.04600 | 1.99105 | 2.02540 | 29.1 | 25.06 |
| 14 | −786.799 | (Variable) | | | | | | 24.89 |
| 15 | −67.421 | 1.30 | 1.91082 | 1.94412 | 1.90323 | 1.92907 | 35.3 | 24.32 |
| 16 | −113.659 | 5.33 | | | | | | 24.50 |
| 17 | −3,917.886 | 3.10 | 1.60311 | 1.61541 | 1.60008 | 1.61002 | 60.6 | 24.52 |
| 18 | −47.049 | (Variable) | | | | | | 24.52 |
| 19 | 773.462 | 2.50 | 1.72047 | 1.74723 | 1.71437 | 1.73512 | 34.7 | 19.33 |
| 20 | −85.797 | 1.15 | 1.53775 | 1.54664 | 1.53555 | 1.54275 | 74.7 | 18.82 |
| 21 | 29.541 | (Variable) | | | | | | 18.66 |
| 22 | 409.189 | 3.42 | 1.48749 | 1.49596 | 1.48534 | 1.49228 | 70.2 | 27.63 |
| 23 | −50.100 | (Variable) | | | | | | 27.90 |
| 24 | −40.723 | 3.50 | 1.81600 | 1.83800 | 1.81075 | 1.82825 | 46.6 | 32.63 |
| 25 | −34.807 | 1.00 | | | | | | 33.89 |
| 26 | −40.647 | 2.00 | 1.53775 | 1.54664 | 1.53555 | 1.54275 | 74.7 | 33.96 |
| 27 | 248.145 | (Variable) | | | | | | 36.12 |
| Image plane | ∞ | | | | | | | |

-continued

| | | | | | |
|---|---|---|---|---|---|
| 5 | 19 | −66.32 | 3.65 | 2.45 | 0.24 |
| 6 | 22 | 91.78 | 3.42 | 2.05 | −0.25 |
| 7 | 24 | −85.91 | 6.50 | 0.17 | −3.99 |

Single lens data

| Lens | First surface | Focal length |
|---|---|---|
| 1 | 1 | −229.31 |
| 2 | 2 | 96.63 |
| 3 | 4 | −115.96 |
| 4 | 6 | −32.17 |
| 5 | 7 | 50.27 |
| 6 | 10 | 55.33 |
| 7 | 12 | 42.28 |
| 8 | 13 | −42.35 |
| 9 | 15 | −184.43 |
| 10 | 17 | 78.93 |
| 11 | 19 | 107.33 |
| 12 | 20 | −40.72 |
| 13 | 22 | 91.78 |
| 14 | 24 | 231.94 |
| 15 | 26 | −64.79 |

Various data
Zoom ratio 3.81

| | Wide angle | Intermediate | Telephoto |
|---|---|---|---|
| Focal length | 102.21 | 195.97 | 389.86 |
| F-number | 3.83 | 4.93 | 5.85 |
| Half angle of view (degrees) | 11.95 | 6.30 | 3.18 |
| Image height | 21.64 | 21.64 | 21.64 |
| Total length of zoom lens | 204.85 | 250.29 | 291.30 |
| BF | 4.31 | 31.68 | 97.49 |
| d 5 | 5.99 | 51.44 | 92.45 |
| d10 | 17.29 | 9.08 | 4.39 |
| d16 | 13.40 | 13.23 | 5.03 |
| d22 | 8.27 | 4.79 | 1.77 |
| d25 | 23.57 | 27.83 | 15.79 |
| d27 | 60.17 | 40.38 | 2.54 |
| d31 | 4.31 | 31.68 | 97.49 |
| Entrance pupil position | 55.83 | 157.25 | 360.55 |
| Exit pupil position | −59.82 | −58.89 | −36.46 |
| Front principal point position | −4.89 | −70.79 | −384.28 |
| Rear principal point position | −97.90 | −164.29 | −292.37 |

[Numerical Data 2]

Unit: mm
Surface data

| Surface number | r | d | nd | ng | nC | nF | vd | Effective diameter |
|---|---|---|---|---|---|---|---|---|
| 1 | 82.361 | 6.50 | 1.73800 | 1.76768 | 1.73131 | 1.75418 | 32.3 | 66.64 |
| 2 | 194.568 | 0.50 | | | | | | 65.81 |
| 3 | 95.804 | 2.10 | 2.00100 | 2.04600 | 1.99105 | 2.02540 | 29.1 | 64.54 |
| 4 | 53.920 | 11.00 | 1.49700 | 1.50451 | 1.49514 | 1.50123 | 81.5 | 61.24 |
| 5 | 314.541 | (Variable) | | | | | | 60.38 |
| 6 | −847.034 | 2.00 | 1.88300 | 1.91050 | 1.87656 | 1.89822 | 40.8 | 32.25 |
| 7 | 91.801 | 2.96 | | | | | | 31.87 |
| 8 | −119.820 | 1.60 | 1.77250 | 1.79197 | 1.76780 | 1.78337 | 49.6 | 31.93 |
| 9 | 45.032 | 4.50 | 1.84666 | 1.89419 | 1.83649 | 1.87210 | 23.8 | 32.97 |
| 10 | 391.560 | (Variable) | | | | | | 33.21 |
| 11 | 1,332.803 | 3.30 | 1.69895 | 1.72941 | 1.69222 | 1.71542 | 30.1 | 34.59 |
| 12 | −109.717 | 0.15 | | | | | | 34.91 |
| 13 | 78.477 | 6.73 | 1.49700 | 1.50451 | 1.49514 | 1.50123 | 81.5 | 35.22 |
| 14 | −73.459 | 1.50 | 2.00100 | 2.04600 | 1.99105 | 2.02540 | 29.1 | 34.97 |
| 15 | −276.058 | 0.90 | | | | | | 35.14 |
| 16 (Stop) | ∞ | (Variable) | | | | | | 35.10 |
| 17 | 68.654 | 5.00 | 1.48749 | 1.49596 | 1.48534 | 1.49228 | 70.2 | 34.97 |
| 18 | −134.896 | 0.27 | | | | | | 34.73 |
| 19 | 171.717 | 6.00 | 1.59522 | 1.60612 | 1.59255 | 1.60134 | 67.7 | 33.92 |
| 20 | −45.192 | 0.52 | | | | | | 33.33 |
| 21 | −43.734 | 2.50 | 1.95375 | 1.99206 | 1.94513 | 1.97465 | 32.3 | 32.66 |
| 22 | −126.835 | (Variable) | | | | | | 32.27 |
| 23 | −305.444 | 2.50 | 1.76182 | 1.79992 | 1.75357 | 1.78230 | 26.5 | 23.08 |
| 24 | −180.266 | 1.15 | 1.53775 | 1.54664 | 1.53555 | 1.54275 | 74.7 | 22.50 |
| 25 | 40.652 | (Variable) | | | | | | 21.60 |
| 26 | 882.399 | 3.66 | 1.48749 | 1.49596 | 1.48534 | 1.49228 | 70.2 | 29.76 |
| 27 | −49.376 | (Variable) | | | | | | 30.02 |
| 28 | −40.607 | 3.50 | 1.88300 | 1.91050 | 1.87656 | 1.89822 | 40.8 | 37.57 |
| 29 | −28.940 | 1.00 | | | | | | 38.10 |
| 30 | −27.643 | 2.00 | 1.49700 | 1.50451 | 1.49514 | 1.50123 | 81.5 | 37.78 |
| 31 | 161.816 | (Variable) | | | | | | 41.32 |
| Image plane | ∞ | | | | | | | |

Zoom lens unit data

| Unit | First surface | Focal length | Lens unit structure length | Front principal point position | Rear principal point position |
|---|---|---|---|---|---|
| 1 | 1 | 196.66 | 20.10 | −7.70 | −19.69 |
| 2 | 6 | −55.70 | 11.06 | 2.47 | −4.81 |
| 3 | 11 | 98.48 | 12.58 | 0.73 | −7.45 |
| 4 | 17 | 76.29 | 14.30 | 1.53 | −7.72 |
| 5 | 23 | −68.80 | 3.65 | 1.85 | −0.31 |
| 6 | 26 | 96.04 | 3.66 | 2.33 | −0.13 |
| 7 | 28 | −85.28 | 6.50 | 0.54 | −3.57 |

Single lens data

| Lens | First surface | Focal length |
|---|---|---|
| 1 | 1 | 188.87 |
| 2 | 3 | −126.38 |
| 3 | 4 | 129.13 |
| 4 | 6 | −93.71 |
| 5 | 8 | −42.19 |
| 6 | 9 | 59.74 |
| 7 | 11 | 145.17 |
| 8 | 13 | 77.48 |
| 9 | 14 | −100.37 |
| 10 | 17 | 94.09 |
| 11 | 19 | 60.73 |
| 12 | 21 | −71.03 |
| 13 | 23 | 572.44 |
| 14 | 24 | −61.57 |
| 15 | 26 | 96.04 |
| 16 | 28 | 100.00 |
| 17 | 30 | −47.34 |

Various data
Zoom ratio 4.66

| | Wide angle | Intermediate | Telephoto |
|---|---|---|---|
| Focal length | 51.80 | 126.89 | 241.22 |
| F-number | 4.04 | 5.18 | 5.77 |
| Half angle of view (degrees) | 22.67 | 9.68 | 5.13 |
| Image height | 21.64 | 21.64 | 21.64 |
| Total length of zoom lens | 136.91 | 175.70 | 210.70 |
| BF | 11.36 | 30.93 | 42.48 |
| d3 | 3.37 | 42.15 | 77.15 |
| d8 | 28.67 | 11.09 | 2.49 |
| d14 | 5.68 | 2.00 | 5.04 |
| d16 | 0.68 | 4.67 | 3.50 |
| d19 | 9.87 | 22.26 | 28.09 |
| d21 | 30.32 | 15.64 | 5.00 |
| d25 | 11.36 | 30.93 | 42.48 |
| Entrance pupil position | 39.97 | 104.61 | 216.21 |
| Exit pupil position | −35.51 | −40.33 | −45.19 |
| Front principal point position | 34.53 | 5.54 | −206.26 |
| Rear principal point position | −40.44 | −95.96 | −198.74 |

Zoom lens unit data

| Unit | First surface | Focal length | Lens unit structure length | Front principal point position | Rear principal point position |
|---|---|---|---|---|---|
| 1 | 1 | 164.42 | 11.10 | −1.57 | −8.66 |
| 2 | 4 | −39.13 | 9.00 | 4.00 | −1.82 |

[Numerical Data 3]

Unit: mm
Surface data

| Surface number | r | d | nd | ng | nC | nF | vd | Effective diameter |
|---|---|---|---|---|---|---|---|---|
| 1 | 62.312 | 2.10 | 1.91082 | 1.94412 | 1.90323 | 1.92907 | 35.3 | 52.89 |
| 2 | 47.706 | 9.00 | 1.49700 | 1.50451 | 1.49514 | 1.50123 | 81.5 | 51.00 |
| 3 | ∞ | (Variable) | | | | | | 50.45 |
| 4 | −9,785.177 | 1.60 | 1.60311 | 1.61541 | 1.60008 | 1.61002 | 60.6 | 28.05 |
| 5 | 81.009 | 2.00 | | | | | | 26.22 |
| 6 | −131.827 | 1.60 | 1.77250 | 1.79197 | 1.76780 | 1.78337 | 49.6 | 25.95 |
| 7 | 20.760 | 3.80 | 1.85478 | 1.90045 | 1.84488 | 1.87935 | 24.8 | 23.66 |
| 8 | 55.309 | (Variable) | | | | | | 23.09 |
| 9 (Stop) | ∞ | 0.98 | | | | | | 19.72 |
| 10 | 90.750 | 2.50 | 1.77250 | 1.79197 | 1.76780 | 1.78337 | 49.6 | 20.13 |
| 11 | −70.028 | 0.15 | | | | | | 20.20 |
| 12 | 30.007 | 4.72 | 1.49700 | 1.50451 | 1.49514 | 1.50123 | 81.5 | 19.86 |
| 13 | −26.703 | 1.25 | 2.00100 | 2.04600 | 1.99105 | 2.02540 | 29.1 | 19.54 |
| 14 | 1,501.833 | (Variable) | | | | | | 19.61 |
| 15 | 86.461 | 3.10 | 1.60311 | 1.61541 | 1.60008 | 1.61002 | 60.6 | 19.94 |
| 16 | −39.357 | (Variable) | | | | | | 19.88 |
| 17 | −117.186 | 2.50 | 1.72047 | 1.74723 | 1.71437 | 1.73512 | 34.7 | 16.25 |
| 18 | −29.664 | 1.15 | 1.53775 | 1.54664 | 1.53555 | 1.54275 | 74.7 | 15.86 |
| 19 | 20.693 | (Variable) | | | | | | 15.08 |
| 20 | 78.249 | 4.00 | 1.48749 | 1.49596 | 1.48534 | 1.49228 | 70.2 | 25.47 |
| 21 | −48.824 | (Variable) | | | | | | 25.65 |
| 22 | −36.762 | 3.50 | 1.61340 | 1.63091 | 1.60925 | 1.62311 | 44.3 | 29.36 |
| 23 | −25.785 | 1.00 | | | | | | 30.21 |
| 24 | −26.831 | 2.00 | 1.59522 | 1.60612 | 1.59255 | 1.60134 | 67.7 | 30.19 |
| 25 | 248.145 | (Variable) | | | | | | 33.62 |
| Image plane | ∞ | | | | | | | |

-continued

Zoom lens unit data

| Unit | First surface | Focal length | Lens unit structure length | Front principal point position | Rear principal point position |
|---|---|---|---|---|---|
| 3 | 9 | 53.52 | 9.60 | −1.61 | −7.47 |
| 4 | 15 | 45.26 | 3.10 | 1.34 | −0.61 |
| 5 | 17 | −38.24 | 3.65 | 1.84 | −0.34 |
| 6 | 20 | 62.32 | 4.00 | 1.67 | −1.04 |
| 7 | 22 | −57.61 | 6.50 | 1.62 | −2.70 |

Single lens data

| Lens | First surface | Focal length |
|---|---|---|
| 1 | 1 | −239.89 |
| 2 | 2 | 95.99 |
| 3 | 4 | −133.21 |
| 4 | 6 | −23.11 |
| 5 | 7 | 37.01 |
| 6 | 10 | 51.52 |
| 7 | 12 | 29.24 |
| 8 | 13 | −26.20 |
| 9 | 15 | 45.26 |
| 10 | 17 | 54.48 |
| 11 | 18 | −22.49 |
| 12 | 20 | 62.32 |
| 13 | 22 | 125.56 |
| 14 | 24 | −40.57 |

[Various data]
Zoom ratio 4.06

| | Wide angle | Intermediate | Telephoto |
|---|---|---|---|
| Focal length | 71.92 | 131.60 | 292.27 |
| F-number | 4.00 | 4.79 | 5.83 |
| Half angle of view (degrees) | 16.74 | 9.34 | 4.23 |
| Image height | 21.64 | 21.64 | 21.64 |
| Total lens length | 170.68 | 207.64 | 241.00 |
| BF | 8.32 | 56.52 | 69.89 |
| d3 | 8.25 | 45.22 | 78.57 |
| d8 | 35.11 | 24.12 | 1.74 |
| d14 | 15.61 | 12.05 | 18.77 |
| d20 | 9.55 | 7.89 | 2.12 |
| d23 | 40.15 | 8.16 | 16.21 |
| d27 | 8.32 | 56.52 | 69.89 |
| Entrance pupil position | 48.24 | 122.42 | 203.88 |
| Exit pupil position | −63.23 | −36.89 | −46.40 |
| Front principal point position | 47.87 | 68.62 | −238.44 |
| Rear principal point position | −63.60 | −75.08 | −222.39 |

[Numerical Data 4]

Unit: mm
Surface data

| Surface number | r | d | nd | ng | nC | nF | vd | Effective diameter |
|---|---|---|---|---|---|---|---|---|
| 1 | 70.673 | 2.10 | 1.91650 | 1.95418 | 1.90803 | 1.93703 | 31.6 | 50.13 |
| 2 | 54.604 | 8.00 | 1.49700 | 1.50451 | 1.49514 | 1.50123 | 81.5 | 48.96 |
| 3 | −950.683 | (Variable) | | | | | | 48.61 |
| 4 | −120.693 | 1.60 | 1.81600 | 1.83800 | 1.81075 | 1.82825 | 46.6 | 26.83 |
| 5 | 134.231 | 2.02 | | | | | | 25.79 |
| 6 | −72.556 | 1.60 | 1.88300 | 1.91050 | 1.87656 | 1.89822 | 40.8 | 25.67 |
| 7 | 44.763 | 4.20 | 1.84666 | 1.89419 | 1.83649 | 1.87210 | 23.8 | 25.34 |
| 8 | −184.596 | (Variable) | | | | | | 25.70 |
| 9 (Stop) | ∞ | 0.98 | | | | | | 26.19 |
| 10 | 120.500 | 3.00 | 1.88300 | 1.91050 | 1.87656 | 1.89822 | 40.8 | 26.58 |
| 11 | −112.138 | 0.15 | | | | | | 26.60 |
| 12 | 45.495 | 5.50 | 1.49700 | 1.50451 | 1.49514 | 1.50123 | 81.5 | 26.07 |
| 13 | −72.512 | 1.25 | 2.00100 | 2.04600 | 1.99105 | 2.02540 | 29.1 | 25.28 |
| 14 | 404.349 | (Variable) | | | | | | 25.05 |
| 15 | 57.791 | 1.30 | 2.00100 | 2.04600 | 1.99105 | 2.02540 | 29.1 | 23.40 |
| 16 | 30.842 | 3.00 | | | | | | 22.83 |
| 17 | 162.567 | 2.70 | 1.77250 | 1.79197 | 1.76780 | 1.78337 | 49.6 | 23.20 |
| 18 | −287.655 | 0.15 | | | | | | 23.42 |
| 19 | 32.412 | 5.50 | 1.48749 | 1.49596 | 1.48534 | 1.49228 | 70.2 | 23.76 |
| 20 | −67.048 | (Variable) | | | | | | 23.39 |
| 21 | −107.987 | 3.00 | 1.72047 | 1.74723 | 1.71437 | 1.73512 | 34.7 | 20.33 |
| 22 | −34.786 | 1.15 | 1.53775 | 1.54664 | 1.53555 | 1.54275 | 74.7 | 20.27 |
| 23 | 29.728 | (Variable) | | | | | | 19.80 |
| 24 | 400.072 | 3.00 | 1.77250 | 1.79197 | 1.76780 | 1.78337 | 49.6 | 37.30 |
| 25 | −700.306 | 1.50 | | | | | | 37.78 |
| 26 | −159.978 | 2.00 | 1.43875 | 1.44442 | 1.43733 | 1.44195 | 94.9 | 37.98 |
| 27 | 160.041 | (Variable) | | | | | | 39.29 |
| Image plane | ∞ | | | | | | | |

Zoom lens unit data

| Unit | First surface | Focal length | Lens unit structure length | Front principal point position | Rear principal point position |
|---|---|---|---|---|---|
| 1 | 1 | 169.63 | 10.10 | −0.85 | −7.30 |
| 2 | 4 | −47.21 | 9.42 | 0.73 | −5.35 |
| 3 | 9 | 57.10 | 10.88 | −0.16 | −6.93 |
| 4 | 15 | 62.01 | 12.65 | 9.63 | 1.04 |
| 5 | 21 | −50.82 | 4.15 | 1.82 | −0.64 |
| 6 | 24 | −415.00 | 6.50 | 8.08 | 3.42 |

Single lens data

| Lens | First surface | Focal length |
|---|---|---|
| 1 | 1 | −279.51 |
| 2 | 2 | 104.18 |
| 3 | 4 | −77.66 |
| 4 | 6 | −31.15 |
| 5 | 7 | 42.91 |
| 6 | 10 | 66.18 |
| 7 | 12 | 57.13 |
| 8 | 13 | −61.34 |
| 9 | 15 | −67.71 |
| 10 | 17 | 134.81 |
| 11 | 19 | 45.65 |
| 12 | 21 | 70.02 |
| 13 | 22 | −29.62 |
| 14 | 24 | 329.99 |
| 15 | 26 | −182.00 |

Various data
Zoom ratio 4.22

| | Wide angle | Intermediate | Telephoto |
|---|---|---|---|
| Focal length | 68.25 | 126.36 | 288.22 |
| F-number | 4.16 | 4.68 | 5.83 |
| Half angle of view (degrees) | 17.59 | 9.72 | 4.29 |
| Image height | 21.64 | 21.64 | 21.64 |
| Total lens length | 168.24 | 189.04 | 207.81 |
| BF | 12.70 | 30.65 | 79.58 |
| d5 | 4.69 | 29.94 | 48.42 |
| d10 | 35.11 | 27.20 | 3.21 |
| d23 | 41.37 | 26.88 | 2.23 |
| d29 | 12.70 | 30.65 | 79.58 |
| Entrance pupil position | 59.66 | 138.47 | 181.05 |
| Exit pupil position | −44.69 | −41.62 | −34.56 |
| Front principal point position | 46.73 | 43.91 | −258.51 |
| Rear principal point position | −55.56 | −95.71 | −208.64 |

Zoom lens unit data

| Unit | First surface | Focal length | Lens unit structure length | Front principal point position | Rear principal point position |
|---|---|---|---|---|---|
| 1 | 1 | 110.87 | 16.10 | 1.16 | −9.67 |
| 2 | 6 | −39.55 | 11.90 | 4.19 | −4.30 |

[Numerical Data 5]

Unit: mm
Surface data

| Surface number | r | d | nd | ng | nC | nF | vd | Effective diameter |
|---|---|---|---|---|---|---|---|---|
| 1 | 86.696 | 5.00 | 1.48749 | 1.49596 | 1.48534 | 1.49228 | 70.2 | 51.96 |
| 2 | 547.987 | 1.00 | | | | | | 51.29 |
| 3 | 73.096 | 2.10 | 1.91082 | 1.94412 | 1.90323 | 1.92907 | 35.3 | 48.65 |
| 4 | 46.644 | 8.00 | 1.49700 | 1.50451 | 1.49514 | 1.50123 | 81.5 | 46.08 |
| 5 | −755.096 | (Variable) | | | | | | 45.64 |
| 6 | 59.021 | 1.60 | 1.81600 | 1.83800 | 1.81075 | 1.82825 | 46.6 | 28.12 |
| 7 | 35.768 | 4.50 | | | | | | 26.17 |
| 8 | −54.725 | 1.60 | 1.88300 | 1.91050 | 1.87656 | 1.89822 | 40.8 | 25.76 |
| 9 | 30.434 | 4.20 | 1.84666 | 1.89419 | 1.83649 | 1.87210 | 23.8 | 24.77 |
| 10 | −752.540 | (Variable) | | | | | | 24.55 |
| 11 (Stop) | ∞ | 1.50 | | | | | | 22.22 |
| 12 | 55.029 | 3.00 | 1.75700 | 1.77687 | 1.75223 | 1.76806 | 47.8 | 22.49 |
| 13 | 364.155 | 0.15 | | | | | | 22.25 |
| 14 | 34.538 | 5.50 | 1.49700 | 1.50451 | 1.49514 | 1.50123 | 81.5 | 21.96 |
| 15 | −39.104 | 1.25 | 1.88300 | 1.91050 | 1.87656 | 1.89822 | 40.8 | 21.22 |
| 16 | 10,811.670 | 9.33 | | | | | | 20.98 |
| 17 | 68.161 | 1.30 | 2.00100 | 2.04600 | 1.99105 | 2.02540 | 29.1 | 19.33 |
| 18 | 31.127 | 3.00 | | | | | | 18.87 |
| 19 | 343.137 | 2.50 | 1.48749 | 1.49596 | 1.48534 | 1.49228 | 70.2 | 19.18 |
| 20 | −48.420 | 0.19 | | | | | | 19.32 |
| 21 | 1,360.580 | 5.50 | 1.61720 | 1.63148 | 1.61375 | 1.62517 | 54.1 | 19.27 |
| 22 | −14.079 | 1.15 | 1.59522 | 1.60612 | 1.59255 | 1.60134 | 67.7 | 19.22 |
| 23 | −52.244 | (Variable) | | | | | | 19.28 |
| 24 | −45.960 | 3.00 | 1.70000 | 1.71834 | 1.69564 | 1.71020 | 48.1 | 26.98 |
| 25 | −28.495 | 1.00 | | | | | | 27.54 |
| 26 | −30.623 | 2.00 | 1.43875 | 1.44442 | 1.43733 | 1.44195 | 94.9 | 27.41 |
| 27 | 28.384 | 4.00 | | | | | | 29.57 |
| 28 | 99.984 | 2.00 | 1.51633 | 1.52621 | 1.51386 | 1.52191 | 64.1 | 30.81 |
| 29 | 828.816 | (Variable) | | | | | | 31.36 |
| Image plane | ∞ | | | | | | | |

-continued

Zoom lens unit data

| Unit | First surface | Focal length | Lens unit structure length | Front principal point position | Rear principal point position |
|---|---|---|---|---|---|
| 3 | 11 | 47.52 | 34.37 | 15.26 | −18.56 |
| 4 | 24 | −65.00 | 12.00 | 1.43 | −8.07 |

Single lens data

| Lens | First surface | Focal length |
|---|---|---|
| 1 | 1 | 210.52 |
| 2 | 3 | −147.08 |
| 3 | 4 | 88.69 |
| 4 | 6 | −114.81 |
| 5 | 8 | −21.96 |
| 6 | 9 | 34.63 |
| 7 | 12 | 85.28 |
| 8 | 14 | 37.84 |
| 9 | 15 | −44.12 |
| 10 | 17 | −58.25 |
| 11 | 19 | 87.22 |
| 12 | 21 | 22.61 |
| 13 | 22 | −32.75 |
| 14 | 24 | 100.05 |
| 15 | 26 | −33.23 |
| 16 | 28 | 220.00 |

Various data
Zoom ratio 4.25

| | Wide angle | Intermediate | Telephoto |
|---|---|---|---|
| Focal length | 68.17 | 138.99 | 289.64 |
| F-number | 4.16 | 5.09 | 5.83 |
| Half angle of view (degrees) | 17.61 | 8.85 | 4.27 |
| Image height | 21.64 | 21.64 | 21.64 |
| Total length of zoom lens | 171.58 | 189.79 | 206.22 |
| BF | 6.03 | 6.03 | 6.03 |
| d5 | 5.00 | 28.64 | 47.33 |
| d10 | 35.11 | 22.40 | 1.76 |
| d23 | 49.69 | 31.30 | 2.60 |
| d27 | 3.50 | 29.17 | 76.24 |
| Entrance pupil position | 58.04 | 121.62 | 165.63 |
| Exit pupil position | −57.68 | −96.17 | −200.71 |
| Front principal point position | 53.26 | 71.59 | 49.47 |
| Rear principal point position | −62.14 | −132.96 | −283.61 |

[Numerical Data 6]

Unit: mm
Surface data

| Surface number | r | d | nd | ng | nC | nF | vd | Effective diameter |
|---|---|---|---|---|---|---|---|---|
| 1 | 78.794 | 5.00 | 1.48749 | 1.49596 | 1.48534 | 1.49228 | 70.2 | 49.68 |
| 2 | 473.763 | 1.00 | | | | | | 49.33 |
| 3 | 70.913 | 2.10 | 1.91082 | 1.94412 | 1.90323 | 1.92907 | 35.3 | 48.10 |
| 4 | 44.698 | 8.77 | 1.49700 | 1.50451 | 1.49514 | 1.50123 | 81.5 | 46.05 |
| 5 | −2,734.365 | (Variable) | | | | | | 45.37 |
| 6 | 308.327 | 1.60 | 1.81600 | 1.83800 | 1.81075 | 1.82825 | 46.6 | 28.27 |
| 7 | 50.996 | 3.50 | | | | | | 26.39 |
| 8 | −71.828 | 1.60 | 1.88300 | 1.91050 | 1.87656 | 1.89822 | 40.8 | 25.98 |
| 9 | 30.852 | 4.20 | 1.84666 | 1.89419 | 1.83649 | 1.87210 | 23.8 | 25.05 |
| 10 | −755.156 | (Variable) | | | | | | 24.82 |
| 11 (Stop) | ∞ | 1.50 | | | | | | 23.31 |
| 12 | 54.542 | 3.00 | 1.81600 | 1.83800 | 1.81075 | 1.82825 | 46.6 | 23.70 |
| 13 | −153.445 | 0.15 | | | | | | 23.55 |
| 14 | 27.648 | 5.50 | 1.49700 | 1.50451 | 1.49514 | 1.50123 | 81.5 | 22.49 |
| 15 | −56.179 | 1.25 | 1.88300 | 1.91050 | 1.87656 | 1.89822 | 40.8 | 21.39 |
| 16 | 86.943 | 7.35 | | | | | | 20.46 |
| 17 | 161.149 | 1.30 | 2.00100 | 2.04600 | 1.99105 | 2.02540 | 29.1 | 17.89 |
| 18 | 31.512 | 3.00 | | | | | | 17.42 |
| 19 | −53.592 | 2.50 | 1.48749 | 1.49596 | 1.48534 | 1.49228 | 70.2 | 17.58 |
| 20 | −34.247 | 0.78 | | | | | | 18.01 |
| 21 | 173.967 | 5.50 | 1.61405 | 1.62799 | 1.61067 | 1.62184 | 55.0 | 18.12 |
| 22 | −12.483 | 1.15 | 1.59522 | 1.60612 | 1.59255 | 1.60134 | 67.7 | 18.12 |
| 23 | −50.270 | (Variable) | | | | | | 19.09 |
| 24 | −74.865 | 4.50 | 1.71300 | 1.72943 | 1.70897 | 1.72221 | 53.9 | 32.63 |
| 25 | −29.367 | 1.00 | | | | | | 33.06 |
| 26 | −25.948 | 2.00 | 1.43875 | 1.44442 | 1.43733 | 1.44195 | 94.9 | 33.00 |
| 27 | 37.164 | (Variable) | | | | | | 36.42 |
| 28 | 63.173 | 4.00 | 1.51633 | 1.52621 | 1.51386 | 1.52191 | 64.1 | 43.08 |
| 29 | 148.077 | 6.03 | | | | | | 42.99 |
| Image plane | ∞ | | | | | | | |

| Unit | First surface | Focal length | Lens unit structure length | Front principal point position | Rear principal point position |
|---|---|---|---|---|---|
| 1 | 1 | 110.91 | 16.87 | 0.51 | −10.79 |
| 2 | 6 | −38.25 | 10.90 | 2.53 | −4.93 |
| 3 | 11 | 49.86 | 32.98 | 8.94 | −23.40 |
| 4 | 24 | −73.22 | 7.50 | 4.02 | −0.88 |
| 5 | 28 | 210.01 | 4.00 | −1.93 | −4.53 |

Single lens data

| Lens | First surface | Focal length |
|---|---|---|
| 1 | 1 | 193.08 |
| 2 | 3 | −138.02 |
| 3 | 4 | 88.58 |
| 4 | 6 | −75.09 |
| 5 | 8 | −24.26 |
| 6 | 9 | 35.10 |
| 7 | 12 | 49.63 |
| 8 | 14 | 38.11 |
| 9 | 15 | −38.49 |
| 10 | 17 | −39.33 |
| 11 | 19 | 186.71 |
| 12 | 21 | 19.18 |
| 13 | 22 | −28.22 |
| 14 | 24 | 65.09 |
| 15 | 26 | −34.49 |
| 16 | 28 | 210.01 |

TABLE 1

| | Numerical Data | | | | | |
|---|---|---|---|---|---|---|
| | 1 | 2 | 3 | 4 | 5 | 6 |
| Numerical Value | | | | | | |
| $\Delta\theta gF$ | 0.0124 | 0.0146 | 0.0121 | 0.0158 | 0.0158 | 0.0158 |
| bft | 72.451 | 97.486 | 42.479 | 69.886 | 79.582 | 86.266 |
| bfw | 12.143 | 4.307 | 11.363 | 8.316 | 12.695 | 13.531 |
| fr | −85.911 | −85.283 | −57.612 | −415.000 | −64.995 | −73.221 |
| TLt | 235.831 | 291.300 | 210.700 | 240.999 | 221.968 | 220.373 |
| Mr | −60.308 | −93.179 | −31.116 | −61.570 | −66.887 | −72.735 |
| ear | 36.122 | 41.320 | 33.621 | 39.287 | 31.365 | 36.424 |
| frn | −64.792 | −47.339 | −40.568 | −182.000 | −33.230 | −34.492 |
| D23w | 33.446 | 17.285 | 29.657 | 36.089 | 36.606 | 36.606 |
| D23t | 2.749 | 4.386 | 3.469 | 2.721 | 4.711 | 3.264 |
| fw | 71.400 | 102.212 | 51.800 | 71.919 | 68.255 | 68.170 |
| ft | 293.232 | 389.859 | 241.219 | 292.275 | 288.223 | 289.644 |
| fl | 171.837 | 196.665 | 164.423 | 169.633 | 110.868 | 110.912 |
| $\beta rt$ | 1.890 | 2.185 | 1.784 | 1.160 | 2.349 | 2.179 |
| $\beta rw$ | 1.188 | 1.092 | 1.244 | 1.012 | 1.319 | 1.185 |
| Conditional Expression | | | | | | |
| (1) $\Delta\theta gF$ | 0.0124 | 0.0146 | 0.0121 | 0.0158 | 0.0158 | 0.0158 |
| (2) bft/bfw | 5.966 | 22.633 | 3.738 | 8.404 | 6.269 | 6.376 |
| (3) fr/bfw | −7.075 | −19.800 | −5.070 | −49.905 | −5.120 | −5.412 |
| (4) TLt/Mr | −3.910 | −3.126 | −6.771 | −3.914 | −3.319 | −3.030 |
| (5) ear/bfw | 2.975 | 9.593 | 2.959 | 4.724 | 2.471 | 2.692 |
| (6) frn/bfw | −5.336 | −10.991 | −3.570 | −21.886 | −2.618 | −2.549 |
| (7) D23w/D23t | 12.166 | 3.941 | 8.549 | 13.261 | 7.770 | 11.214 |
| (8) fw/bfw | 5.880 | 23.730 | 4.559 | 8.648 | 5.376 | 5.038 |
| (9) ft/bft | 4.047 | 3.999 | 5.679 | 4.182 | 3.622 | 3.358 |
| (10) fl/ft | 0.586 | 0.504 | 0.682 | 0.580 | 0.385 | 0.383 |
| (11) $\beta rt/\beta rw$ | 1.591 | 2.000 | 1.434 | 1.147 | 1.780 | 1.838 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-141664, filed Jul. 21, 2017, which is hereby incorporated by reference herein in its entirety.

What is claimed is:

1. A zoom lens comprising, in order from an object side to an image side:

a first lens unit having a positive refractive power;

a second lens unit having a negative refractive power;

a third lens unit having a positive refractive power; and a rear lens group including at least one lens unit, wherein an interval between each pair of adjacent lens units is changed during zooming, wherein the rear lens group includes a lens unit LR having a negative refractive power, wherein the lens unit LR includes at least one positive lens and at least one negative lens, wherein the at least one negative lens includes a negative lens LRN made of a material having a largest Abbe number of the at least one negative lens and satisfying the following conditional expression:

$$0.0 < \Delta\theta gF < 0.3,$$

where $\Delta\theta gF$ represents an extraordinary partial dispersion ratio of the material, and wherein the following conditional expressions are satisfied:

$$3.5 < bft/bfw < 50.0;\ \text{and}$$

$$-100.0 < fr/bfw < -5.0,$$

where "bft" represents a distance from a lens surface on the image side of the lens unit LR to an image plane at a telephoto end, "bfw" represents a distance from the lens surface on the image side of the lens unit LR to the image plane at a wide angle end, and "fr" represents a focal length of the lens unit LR.

2. A zoom lens according to claim 1, wherein the following conditional expression is satisfied:

$$-10.0 < TLt/Mr < -2.0,$$

where TLt represents a total length of the zoom lens at the telephoto end, Mr represents a movement amount of the lens unit LR during zooming from the wide angle end to the telephoto end, the movement amount having a positive sign when the lens unit LR is located closer to the image side at the telephoto end than at the wide angle end, and having a negative sign when the lens unit LR is located closer to the object side at the telephoto end than at the wide angle end.

3. A zoom lens according to claim 1, wherein the following conditional expression is satisfied:

$$2.0 < ear/bfw < 10.0,$$

where "ear" represents an effective diameter of a lens surface closest to the image side in the lens unit LR.

4. A zoom lens according to claim 1, wherein the following conditional expression is satisfied:

$$-30.0 < frn/bfw < -2.0,$$

where "frn" represents a focal length of the negative lens LRN.

5. A zoom lens according to claim 1, wherein the following conditional expression is satisfied:

$$2.0 < D23w/D23t < 20.0,$$

where D23w represents an interval on an optical axis between the second lens unit and the third lens unit at the wide angle end, and D23t represents a lens interval between the second lens unit and the third lens unit at the telephoto end.

6. A zoom lens according to claim 1, wherein the following conditional expression is satisfied:

$$4.0 < fw/bfw < 25.0,$$

where "fw" represents a focal length of the zoom lens at the wide angle end.

7. A zoom lens according to claim 1, wherein the following conditional expression is satisfied:

$$3.0 < ft/bft < 6.0,$$

where "ft" represents a focal length of the zoom lens at the telephoto end.

8. A zoom lens according to claim 1, wherein the following conditional expression is satisfied:

$$0.2 < f1/ft < 1.1,$$

where f1 represents a focal length of the first lens unit, and "ft" represents a focal length of the zoom lens at the telephoto end.

9. A zoom lens according to claim 1, wherein the following conditional expression is satisfied:

$$1.0 < \beta rt/\beta rw < 2.5,$$

where "βrw" represents a lateral magnification of the lens unit LR at the wide angle end, and "βrt" represents a lateral magnification of the lens unit LR at the telephoto end when focused at infinity.

10. A zoom lens according to claim 1, wherein the lens unit LR is arranged closest to the image side in the rear lens group.

11. A zoom lens according to claim 1,
wherein the rear lens group consists of, in order from the object side to the image side:
a fourth lens unit having a positive refractive power;
a fifth lens unit having a negative refractive power;
a sixth lens unit having a positive refractive power; and
a seventh lens unit having a negative refractive power, and
wherein the lens unit LR is the seventh lens unit.

12. A zoom lens according to claim 1,
wherein the rear lens group consists of, in order from the object side to the image side:
a fourth lens unit having a positive refractive power;
a fifth lens unit having a negative refractive power; and
a sixth lens unit having a negative refractive power, and
wherein the lens unit LR is the sixth lens unit.

13. A zoom lens according to claim 1,
wherein the rear lens group consists of a fourth lens unit having a negative refractive power, and
wherein the lens unit LR is the fourth lens unit.

14. A zoom lens according to claim 1,
wherein the rear lens group consists of, in order from the object side to the image side:
a fourth lens unit having a negative refractive power; and
a fifth lens unit having a positive refractive power; and
wherein the lens unit LR is the fourth lens unit.

15. An image pickup apparatus comprising:
a zoom lens; and
a photoelectric conversion element configured to receive light of an image formed by the zoom lens,
wherein the zoom lens includes, in order from an object side to an image side:
a first lens unit having a positive refractive power;
a second lens unit having a negative refractive power;
a third lens unit having a positive refractive power; and
a rear lens group including at least one lens unit,
wherein an interval between each pair of adjacent lens units is changed during zooming,
wherein the rear lens group includes a lens unit LR having a negative refractive power,
wherein the lens unit LR includes at least one positive lens and at least one negative lens,
wherein the at least one negative lens includes a negative lens LRN made of a material having a largest Abbe number of the at least one negative lens and satisfying the following conditional expression:

$$0.0 < \Delta\theta gF < 0.3,$$

where ΔθgF represents an extraordinary partial dispersion ratio of the material, and
wherein the following conditional expressions are satisfied:

$$3.5 < bft/bfw < 50.0;\ \text{and}$$

$$-100.0 < fr/bfw < -5.0,$$

where "bft" represents a distance from a lens surface on the image side of the lens unit LR to an image plane at a telephoto end, "bfw" represents a distance from the lens surface on the image side of the lens unit LR to the image plane at a wide angle end, and "fr" represents a focal length of the lens unit LR.

* * * * *